(12) United States Patent
Kakuta et al.

(10) Patent No.: US 10,322,609 B2
(45) Date of Patent: Jun. 18, 2019

(54) HEAVY DUTY PNEUMATIC TIRE

(71) Applicant: The Yokohama Rubber Co., LTD., Minato-ku, Tokyo (JP)

(72) Inventors: Shoei Kakuta, Hiratsuka (JP); Hideki Hamanaka, Hiratsuka (JP); Yukihito Yamaguchi, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/328,427

(22) PCT Filed: May 13, 2015

(86) PCT No.: PCT/JP2015/063719
§ 371 (c)(1),
(2) Date: Jan. 23, 2017

(87) PCT Pub. No.: WO2016/013276
PCT Pub. Date: Jan. 28, 2016

(65) Prior Publication Data
US 2017/0225518 A1    Aug. 10, 2017

(30) Foreign Application Priority Data

Jul. 23, 2014 (JP) ................................ 2014-149818
Jul. 23, 2014 (JP) ................................ 2014-149822
(Continued)

(51) Int. Cl.
*B60C 11/11* (2006.01)
*B60C 11/117* (2006.01)
(Continued)

(52) U.S. Cl.
CPC ........... *B60C 11/13* (2013.01); *B60C 11/0311* (2013.01); *B60C 11/11* (2013.01);
(Continued)

(58) Field of Classification Search
CPC ......... B60C 11/0311; B60C 2011/0381; B60C 2200/06; B60C 11/032
(Continued)

(56) References Cited

U.S. PATENT DOCUMENTS

D457,128 S * 5/2002 Robert .......................... D12/579
2004/0211502 A1* 10/2004 Ono ......................... B60C 11/00
152/209.19
(Continued)

FOREIGN PATENT DOCUMENTS

GB    1487958 A  * 10/1977  ......... B60C 11/0306
JP    H09-136514     5/1997
(Continued)

OTHER PUBLICATIONS

Machine Translation: JP 2004262295 A; Ono, Akira; no date.*
(Continued)

*Primary Examiner* — Kendra Ly
(74) *Attorney, Agent, or Firm* — Thorpe North & Western

(57) ABSTRACT

A tread pattern is provided with: shoulder lug grooves open at ground contact ends; center lug grooves each having opposite ends; circumferential primary grooves each formed in a wavy shape by connecting ends of the center lug grooves and the inner ends of the shoulder lug grooves in the width direction of the tire; and center blocks defined by the center lug grooves and the pair of circumferential primary grooves. The width of the circumferential primary grooves is smaller than the width of the shoulder lug grooves. The center lug grooves are tilted relative to both the circumferential direction and the width direction of the tire and each (Continued)

have a third groove turning portion and a fourth groove turning portion which protrude in the different directions in the circumferential direction of the tire.

16 Claims, 10 Drawing Sheets

(30) Foreign Application Priority Data

| | | | |
|---|---|---|---|
| Jul. 23, 2014 | (JP) | ................................ | 2014-149823 |
| Jul. 23, 2014 | (JP) | ................................ | 2014-149824 |
| Jul. 23, 2014 | (JP) | ................................ | 2014-149825 |
| Jul. 23, 2014 | (JP) | ................................ | 2014-149830 |
| Oct. 16, 2014 | (JP) | ................................ | 2014-211964 |
| Oct. 20, 2014 | (JP) | ................................ | 2014-213679 |

(51) Int. Cl.
 *B60C 11/13* (2006.01)
 *B60C 11/03* (2006.01)

(52) U.S. Cl.
 CPC ... *B60C 11/1369* (2013.01); *B60C 2011/0344* (2013.01); *B60C 2011/0346* (2013.01); *B60C 2011/0353* (2013.01); *B60C 2011/0355* (2013.01); *B60C 2011/0369* (2013.01); *B60C 2011/0383* (2013.01); *B60C 2200/065* (2013.01)

(58) Field of Classification Search
 USPC .................................................... 152/209.17
 See application file for complete search history.

(56) References Cited

U.S. PATENT DOCUMENTS

| | | | |
|---|---|---|---|
| 2007/0199633 A1* | 8/2007 | Hayashi | .............. B60C 11/0311 |
| | | | 152/209.18 |
| 2009/0032157 A1* | 2/2009 | Inoue | .................. B60C 11/0311 |
| | | | 152/209.8 |

FOREIGN PATENT DOCUMENTS

| | | | | | |
|---|---|---|---|---|---|
| JP | 2000177328 A | * | 6/2000 | | ......... B60C 11/0311 |
| JP | 2001055017 A | * | 2/2001 | | |
| JP | 2002002231 A | * | 1/2002 | | |
| JP | 2004-098914 | | 4/2004 | | |
| JP | 2004098914 A | * | 4/2004 | | |
| JP | 2004-224131 | | 8/2004 | | |
| JP | 2004262295 A | * | 9/2004 | | ......... B60C 11/0311 |
| JP | 2007-191093 | | 8/2007 | | |
| JP | 2010-125999 | | 6/2010 | | |

OTHER PUBLICATIONS

Machine Translation: JP 2002002231 A; Yamada, Seiji; no date.*
Machine Translation: JP 2000177328 A; Aoki, Namihito; no date.*
Machine Translation: JP 2004098914 A; Okubo, Yumiko; no date.*
Machine Translation: JP 2001055017 A; Fukazawa, Shiro; no date.*
International Search Report for International Application No. PCT/JP2015/063719 dated Jun. 23, 2015, 4 pages, Japan.

* cited by examiner

HEAVY DUTY PNEUMATIC TIRE

TECHNICAL FIELD

The present technology relates to a heavy duty pneumatic tire having a tread pattern.

BACKGROUND ART

Recent pneumatic tires are required to have various kinds of enhanced performance, and their tread patterns are contrived to enhance the performance. Heavy duty tires are provided with tread patterns that enhance traction performance.

For example, a heavy duty pneumatic tire is known that improves in both traction performance in traveling on a bad road and wet performance in traveling at high speed until the terminal stage of wear (Japanese Unexamined Patent Application Publication No. H09-136514A). The heavy duty pneumatic tire includes, in a tread, at least one circumferential groove extending in the circumferential direction and a large number of lateral grooves connecting with the circumferential groove and disposed on both sides of the circumferential groove while separated from each other in the circumferential direction. In the pneumatic tire:

(1) the circumferential groove extends in the circumferential direction in a tread central region that corresponds to 50% of the tread width;

(2) the depth of the circumferential groove is 5% of the tread width or greater; and (3) the depth of at least lateral grooves disposed in both side sections of the tread among the lateral grooves is 109% of the depth of the circumferential groove or greater.

According to Japanese Unexamined Patent Application Publication No. H09-136514A, this configuration enhances both traction performance in traveling on a bad road and wet performance in traveling at high speed.

In heavy duty pneumatic tires, land portions in the tread central regions have areas increased for improving cut resistance and wear resistance. Such a land portion in the tread central region having an increased area decreases a groove area and thus decreases edges, causing a reduction in traction performance.

The heavy duty pneumatic tire according to Japanese Unexamined Patent Application Publication No. H09-136514A can improve in traction performance in the terminal stage of wear; however, the tread central region is worn earlier than the tread shoulder regions before the terminal stage of wear.

Especially pneumatic tires that are fitted to buses, trucks, or the like, or large tires that have a size of, for example, 49 inches or greater and are fitted to dump trucks traveling off-road, for example, on mines are preferred to improve in both traction performance and wear resistance in the tread central regions in view of effective use of the tires.

SUMMARY

The present technology provides a heavy duty pneumatic tire having a tread pattern that at least maintains traction performance and further improves in traction performance and that improves in wear resistance in a tread central region.

The present technology includes various embodiments described below.

First Embodiment

A heavy duty pneumatic tire includes a tread portion provided with a tread pattern. The tread pattern includes: a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends; a plurality of shoulder lug grooves being separated from each other in the tire circumferential direction, the shoulder lug grooves extending toward an outside in the tire width direction in each of the half-tread regions, the shoulder lug grooves including outside ends in the tire width direction opening at ground contact ends positioned on both sides in the tire width direction, and the shoulder lug grooves each being disposed in the tire circumferential direction between adjacent center lug grooves in the tire circumferential direction among the center lug grooves; a pair of circumferential primary grooves being disposed in the half-tread regions and being provided with first groove turning portions being curved or bent outward in the tire width direction and second groove turning portions being curved or bent inward in the tire width direction, the first groove turning portions and the second groove turning portions being arranged such that each of the circumferential primary grooves alternately connects an end of the center lug grooves and an end of the shoulder lug groove on an inside in the tire width direction in each of the half-tread regions, the circumferential primary grooves being formed in a wavy shape over an entire periphery of the tire, the circumferential primary grooves having a narrower width than a width of the shoulder lug grooves; and a plurality of center blocks being defined by the center lug grooves and the pair of circumferential primary grooves and being aligned in the tire circumferential direction. The center lug grooves each include a third groove turning portion bent or curved so as to protrude toward a third side in the tire circumferential direction on the first side and a fourth groove turning portion bent or curved so as to protrude toward a fourth side opposite to the third side in the tire circumferential direction on the second side. The center lug grooves each connect with the circumferential primary grooves at a first connection end on the first side and at a second connection end on the second side, each of the first connection end and the second connection end connecting with a tip of one of the second groove turning portions on the inside in the tire width direction, and the second connection end of the center lug groove being positioned on the third side in the tire circumferential direction with respect to the first connection end. Concerning central positions of the center lug grooves in a groove width direction, an inclination angle of a first straight line connecting between the first connection end and a protruding end toward the third side in the tire circumferential direction of the third groove turning portion with respect to the tire width direction and an inclination angle of a second straight line connecting between the second connection end and a protruding end toward the third side in the tire circumferential direction of the fourth groove turning portion with respect to the tire width direction are greater than an inclination angle of a third straight line connecting between the first connection end and the second connection end of each of the center lug grooves with respect to the tire width direction.

Second Embodiment

In the heavy duty pneumatic tire according to the first embodiment, concerning the central positions of the center lug grooves in the groove width direction, a section of each of the center lug groove between the protruding end toward the third side in the tire circumferential direction of the third groove turning portion and the first connection end is on the first straight line or on the third side with respect to the first straight line, and a section of each of the center lug grooves between the protruding end toward the fourth side in the tire circumferential direction of the fourth groove turning portion and the second connection end is on the second straight line or on the fourth side with respect to the second straight line.

Third Embodiment

In the heavy duty pneumatic tire according to the first or second embodiment, the pair of circumferential primary grooves each includes a raised bottom portion formed by partially making a groove depth shallow.

Fourth Embodiment

In the heavy duty pneumatic tire according to the third embodiment, the groove depth D1 of the raised bottom portion and a ground contact width T of the tread portion in the tire width direction satisfy a relationship of D1/T<0.05.

Fifth Embodiment

The heavy duty pneumatic tire according to any one of the first to fourth embodiments, further includes both-end-closed grooves being disposed in regions enclosed by the circumferential primary grooves and the center lug grooves, the both-end-closed grooves including both ends in positions separated from the circumferential primary grooves and the center lug grooves, and the both-end-closed grooves extending in the tire width direction. A width W1 of the both-end-closed grooves is 15 mm≤W1≤25 mm.

Sixth Embodiment

In the heavy duty pneumatic tire according to the fifth embodiment, a width W2 of the center lug grooves satisfies a relationship of 1.20≤W1/W2≤2.50.

Seventh Embodiment

In the heavy duty pneumatic tire according to the fifth or sixth embodiment, a maximum depth D2 of the both-end-closed grooves and a maximum depth D3 of the center lug grooves satisfy a relationship of 0.5≤D2/D3≤1.0.

Eighth Embodiment

In the heavy duty tire according to any one of the fifth to seventh embodiments, a maximum width WB of the center blocks in the tire width direction and a maximum length L1 of the both-end-closed grooves in the tire width direction satisfy a relationship of 0.3≤L1/WB≤0.6.

Ninth Embodiment

In the heavy duty pneumatic tire according to any one of the fifth to eighth embodiments, the maximum length L1 of the both-end-closed grooves in the tire width direction and a waving range A of the wavy shapes of the circumferential primary grooves satisfy a relationship of 0.3≤A/L1≤0.5.

Tenth Embodiment

In the heavy duty pneumatic tire according to any one of the fifth to ninth embodiments, the both-end-closed grooves are inclined with respect to the tire circumferential direction; and an inclination angle of the both-end-closed grooves with respect to the tire circumferential direction is 70° or greater and 90° or less.

Eleventh Embodiment

The heavy duty pneumatic tire according to any one of the fifth to tenth embodiments, further includes circumferential secondary grooves extending in the tire circumferential direction so as to intersect the both-end-closed grooves, the circumferential secondary grooves including both ends connecting with the center lug grooves.

Twelfth Embodiment

The heavy duty pneumatic tire according to any one of the first to fourth embodiments, further includes circumferential secondary grooves connecting adjacent center lug grooves in the tire circumferential direction among the center lug grooves, a depth of the circumferential secondary grooves being shallower than a depth of the circumferential primary grooves. The circumferential secondary grooves respectively connect with the center lug grooves in positions in a region between and inclusive of the third groove turning portion and the fourth groove turning portion in the tire width direction.

Thirteenth Embodiment

In the heavy duty pneumatic tire according to the twelfth embodiment, the circumferential secondary grooves include groove turning portions being curved or bent.

Fourteenth Embodiment

In the heavy duty pneumatic tire according to the thirteenth embodiment, a ratio P4/P1 of a width P4 of the circumferential secondary grooves to a width P1 of the circumferential primary grooves is 0.70 to 1.10.

Fifteenth Embodiment

In the heavy duty pneumatic tire according to the thirteenth or fourteenth embodiment, the circumferential secondary grooves meander in the tire width direction; and a ratio of a maximum displacement value of the meandering of the circumferential secondary grooves to the maximum width WB of the center blocks is 0.05 to 0.35.

Sixteenth Embodiment

In the heavy duty pneumatic tire according to the twelfth embodiment, the circumferential secondary grooves each extend straight while being inclined with respect to the tire circumferential direction such that one connection end of each of the circumferential secondary grooves connects with the third groove turning portion and that the other connection end of each of the circumferential secondary grooves connects with the fourth groove turning portion. An inclination angle of the circumferential secondary groove with respect to the tire circumferential direction is different from an inclination angle of sections, inclined toward an identical side in the tire width direction with a side toward which the circumferential secondary groove is inclined, of the circumferential primary grooves with respect to the tire circumferential direction.

Seventeenth Embodiment

In the heavy duty pneumatic tire according to the sixteenth embodiment, an absolute value of the difference between the inclination angles is 10° to 25°.

Eighteenth Embodiment

The heavy duty pneumatic tire according to any one of the first to fourth embodiments, further includes a single circumferential secondary groove being shallower than the circumferential primary grooves, the circumferential secondary groove being provided so as to extend over an entire periphery of the tire along the tire equator line. The circumferential secondary groove intersects the center lug grooves so as to penetrate the center lug grooves in regions between and inclusive of the third groove turning portions and the fourth groove turning portions in the tire width direction.

Nineteenth Embodiment

In the heavy duty pneumatic tire according to the eighteenth embodiment, the circumferential secondary groove includes, on a periphery of the tire, fifth groove turning portions being curved or bent and sixth groove turning portions being curved or bent. Upon viewing the tread pattern from an outside toward an inside in a tire radial direction in traveling toward the third side in the tire circumferential direction, the fifth groove turning portions change a direction thereof clockwise, and the sixth groove turning portions change a direction thereof counterclockwise. Each of sections of the circumferential secondary groove between adjacent center lug grooves among the center lug grooves is provided with one of the fifth groove turning portions and one of the sixth groove turning portions.

Twentieth Embodiment

In the heavy duty pneumatic tire according to the nineteenth embodiment, the circumferential secondary groove is provided with pairs of two successive fifth groove turning portions of the fifth groove turning portions and pairs of two successive sixth groove turning portions of the sixth groove turning portions in the tire circumferential direction; and the center lug grooves intersect between the two successive fifth groove turning portions and between the two successive sixth groove turning portions.

Twenty-First Embodiment

In the heavy duty pneumatic tire according to the nineteenth or twentieth embodiment, the circumferential secondary groove is provided, over the periphery of the tire, with a plurality of sets of one of the fifth groove turning portions, another of the fifth groove turning portions, one of the sixth groove turning portions, and another of the sixth groove turning portions being arranged successively in the tire circumferential direction. A section between the one fifth groove turning portion and the other fifth groove turning portion and a section between the one sixth groove turning portion and the other sixth groove turning portion, of the circumferential secondary groove are straight grooves extending parallel to the tire equator line.

Twenty-Second Embodiment

In the heavy duty pneumatic tire according to any one of the first to twenty-first embodiments, the maximum width WB of the center blocks in the tire width direction and the tread width T of the tread portion in the tire width direction satisfy a relationship of $0.35 \leq WB/T \leq 0.55$.

Twenty-Third Embodiment

In the heavy duty pneumatic tire according to any one of the first to twenty-second embodiments, the center blocks have corners in correspondence with the first groove turning portions of the circumferential primary grooves; and the corners have obtuse angles.

Twenty-Fourth Embodiment

In the heavy duty pneumatic tire according to any one of the first to twenty-third embodiments, the width of the circumferential primary grooves and the width of the center lug groove are 7 mm or greater and 20 mm or less.

Twenty-Fifth Embodiment

The heavy duty pneumatic tire according to any one of the first to twenty-fourth embodiments, is fitted to a construction or industrial vehicle.

The above-described tire at least maintains traction performance and further improves in traction performance, and improves in wear resistance in a tread central region.

DETAILED DESCRIPTION

A pneumatic tire according to an embodiment will now be described in detail with reference to the attached drawings.

In this specification, "tire width direction" refers to a direction of the central axis of rotation of the pneumatic tire, and "tire circumferential direction" refers to a direction in which a rotating surface of a tread surface rotates, the rotating surface being formed when the tire rotates about the central axis of rotation of the tire. "Tire radial direction" refers to a radial direction from the central axis of rotation of the tire. "Outside in the tire radial direction" refers to a side that is far from the central axis of rotation of the tire, and "inside in the tire radial direction" refers to a side that is near to the central axis of rotation of the tire. "Outside in the tire width direction" refers to a side that is far from a tire equator line in the tire width direction, and "inside in the tire width direction" refers to a side that is near to the tire equator line in the tire width direction.

Heavy duty tires in this specification include tires for Classification 1 (dump trucks, scrapers), Classification 2 (graders), Classification 3 (shovel loaders and the like), Classification 4 (tired rollers), and mobile cranes (truck cranes, wheel cranes) written in Section D of JATMA YEAR BOOK 2014 (standards of The Japan Automobile Tyre Manufacturers Association, Inc.) and vehicular tires written in SECTION 4 or SECTION 6 of TRA 2013 YEAR BOOK. Heavy duty pneumatic tires according to the present embodiment are fitted to, for example, construction or industrial vehicles mentioned above. Construction or industrial vehicles include damp trucks, scrapers, graders, shovel loaders, tired rollers, wheel cranes, truck cranes, or vehicles, such as compactors, earthmovers, graders, loaders, and dozers.

Figure 1:
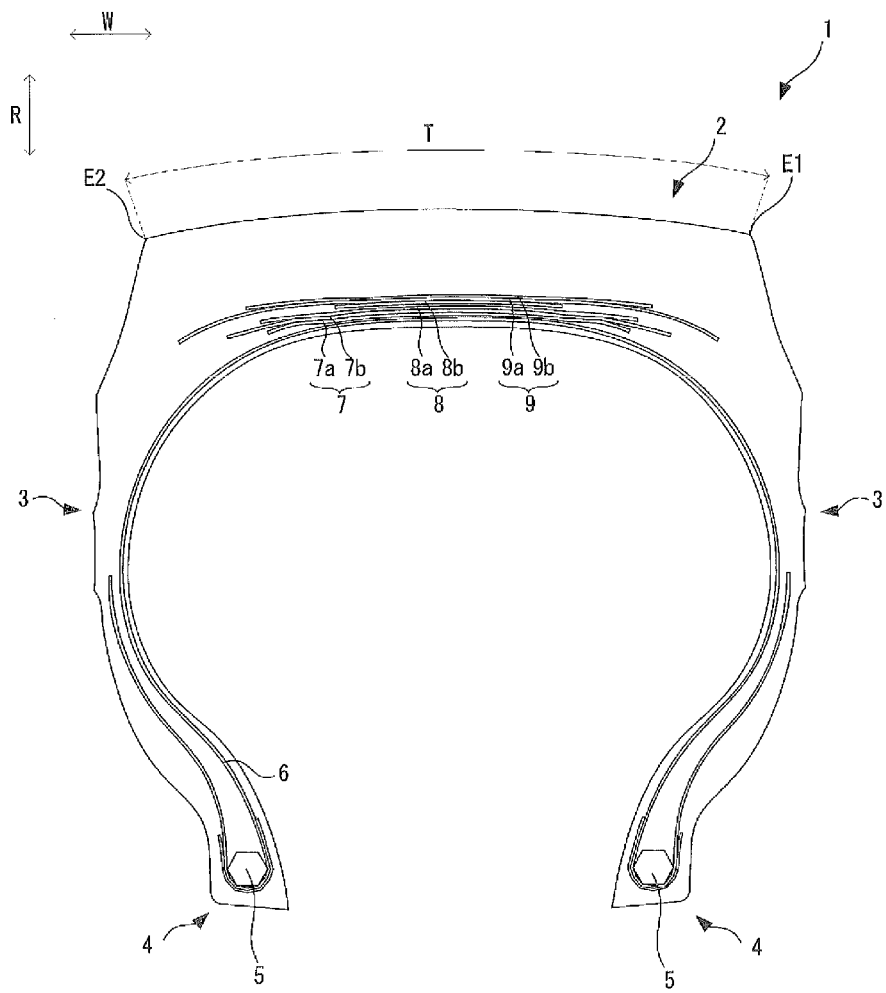
FIG. 1 is a cross-sectional view of an example heavy duty pneumatic tire according to an embodiment.

FIG. 1 is a cross-sectional view of a pneumatic radial tire (hereinafter referred to as a tire) according to the present embodiment, in a plane passing through the rotational axis of the tire. Grooves in a tread pattern are omitted in FIG. 1. The tire radial direction is indicated by R and the tire width direction by W in FIG. 1.

The tire 1 in FIG. 1 includes a tread portion 2, a sidewall portion 3, and a bead portion 4. The bead portion 4 includes a pair of bead cores 5 on both sides in the tire width direction. A carcass layer 6 extends between the pair of bead cores 5. Both ends of the carcass layer 6 are folded back around the bead cores 5 from the inside to the outside of the tire. The carcass layer 6 may be composed of a single carcass ply or a plurality of carcass plies.

A first crossing belt layer 7, a second crossing belt layer 8, and a third crossing belt layer 9 are disposed in this order on the outer periphery of the carcass layer 6 in the tread portion 2 from the inside toward the outside in the tire radial direction. The first crossing belt layer 7 is composed of two belts 7a, 7b. The second crossing belt layer 8 is composed of two belts 8a, 8b. The third crossing belt layer 9 is composed of two belts 9a, 9b. Each of the belts 7a, 7b, 8a, 8b, 9a, 9b has a reinforcing cord inclined with respect to the tire circumferential direction. Preferably, the inclination angle of the reinforcing cord with respect to the tire circumferential direction is from 20° to 24°.

In the embodiment of the first crossing belt layer 7 illustrated in FIG. 1, the belt 7a is disposed inside in the tire radial direction with respect to the belt 7b, and the belt 7b is disposed outside in the tire radial direction with respect to the belt 7a. The belt 7a is narrower than the belt 7b in the tire width direction. The reinforcing cords of the belts 7a, 7b are inclined in mutually different directions with respect to the tire circumferential direction so as to cross each other.

In the embodiment of the second crossing belt layer 8 illustrated in FIG. 1, the belt 8a is disposed inside in the tire radial direction with respect to the belt 8b, and the belt 8b is disposed outside in the tire radial direction with respect to the belt 8a. The belt 8a is wider than the belt 8b in the tire width direction. The reinforcing cords of the belts 8a, 8b are inclined in mutually different directions with respect to the tire circumferential direction so as to cross each other.

In the embodiment of the third crossing belt layer 9 illustrated in FIG. 1, the belt 9a is disposed inside in the tire radial direction with respect to the belt 9b, and the belt 9b is disposed outside in the tire radial direction with respect to the belt 9a. The belt 9a is wider than the belt 9b in the tire width direction. The reinforcing cords of the belts 9a, 9b are inclined in mutually different directions with respect to the tire circumferential direction so as to cross each other.

FIG. 1 illustrates an example embodiment of the belts 7a, 7b, 8a, 8b, 9a, 9b and should not be construed to limit the width of each of the belts 7a, 7b, 8a, 8b, 9a, 9b. The three crossing belt layers 7, 8, 9 are provided in FIG. 1; however, this should not be construed to limit the belt configuration, and only two crossing belt layers may be provided. A cushioning material sheet (for example, a rubber layer) may be partially provided between the belts 7a, 7b, 8a, 8b, 9a, 9b.

One or a plurality of rubber layers composing the tread portion 2 are formed outside of the first crossing belt layer 7, the second crossing belt layer 8, and the third crossing belt layer 9 in the tire radial direction. The ratio (tan δ) of loss elastic modulus to storage elastic modulus at 60° C. of the outermost rubber of the tread portion 2 in the tire radial direction is preferably 0.04 or greater and 0.2 or less.

This configuration of the tire 1 is an example, and the tire 1 may have another known configuration.

Tread Pattern

Figure 2:
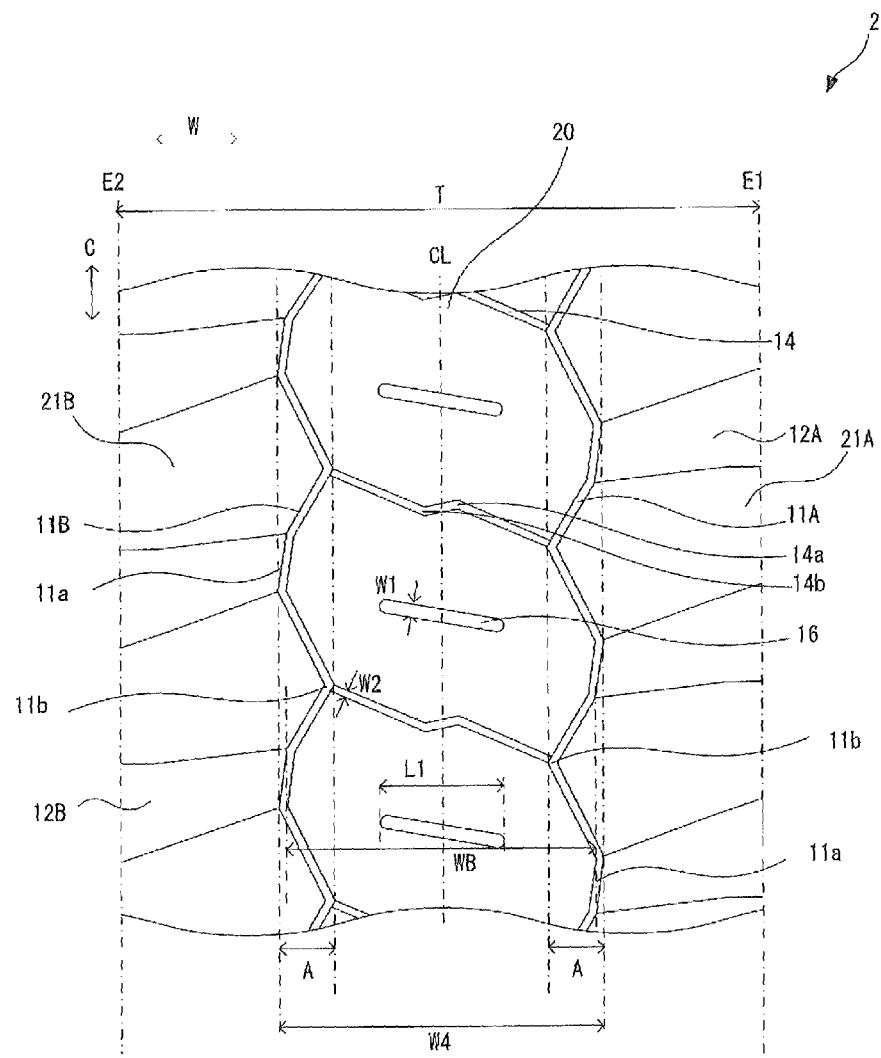
FIG. 2 is a planar development diagram of a tread pattern provided in a tread portion of the tire according to the embodiment.

FIG. 2 is a planar development diagram of a tread pattern provided in the tread portion 2 of the tire 1 according to the present embodiment. The tire circumferential direction is indicated by C and the tire width direction by W in FIG. 2.

The tread portion 2 includes, as a tread pattern, a pair of circumferential primary grooves 11A, 11B, a plurality of shoulder lug grooves 12A, 12B, a plurality of center lug grooves 14, and a plurality of both-end-closed grooves 16. In the present embodiment, the tread pattern of the tread portion 2 is provided so as to be point-symmetric with respect to an intersecting point of a desired center lug groove 14 and the tire equator line CL.

The center lug grooves 14 are separated from each other in the tire circumferential direction. The center lug grooves 14 extend in half-tread regions on a first side and a second side being both sides of the tire equator line CL in the tire width direction so as to cross the tire equator line CL, and have both ends. The center lug grooves 14 communicate with the circumferential primary groove 11A disposed in one of the half-tread regions (the half-tread region on the first side between the tire equator line CL and one tread end E1) and the circumferential primary groove 11B disposed on the other of the half-tread regions (the half-tread region on the second side between the tire equator line CL and the other tread end E2).

The tread ends E1, E2 (ground contact ends) are intersecting points of an extending line along the outer shape of the tread portion 2 and an extending line along the outer shape of the side portion 3. If the connections between the tread portion 2 and the side portion 3 are not round, the connections between the outer shapes of the tread portion 2 and the sidewall portion 3 are the tread ends E1, E2 as illustrated in FIG. 1. The tread width T is a distance between the tread ends E1, E2.

The ends of the center lug grooves 14 on the circumferential primary groove 11A side and the circumferential primary groove 11B side are shifted in position in the tire circumferential direction, and the center lug grooves 14 are inclined with respect to the tire width direction. In the present embodiment, the inclination angle of the center lug grooves 14 with respect to the tire circumferential direction is 55° or greater and 75° or less.

The center lug grooves 14 have a narrower width than the width of the shoulder lug grooves 12A, 12B.

Angles between the center lug grooves 14 and the circumferential primary groove 11A or the circumferential primary groove 11B are preferably obtuse. In other words, angles of the corners, at connections 11a, 11b, of a plurality of center blocks 20 defined by the center lug grooves 14 and the pair of circumferential primary grooves 11A, 11B so as to be aligned in the tire circumferential direction are preferably obtuse. Obtuse angles between the center lug grooves 14 and the circumferential primary groove 11A or the circumferential primary groove 11B allow the corners of the center blocks 20 to have sufficient rigidity. If the center blocks 20 have corners in correspondence with first groove turning portions 11a of the circumferential primary grooves 11A, 11B, the corners preferably have obtuse angles. This configuration prevents elastic deformation at the corners of the center blocks 20 and heat buildup due to the elastic deformation.

Each of the center lug grooves 14 is provided with two bends or curves, a third groove turning portion 14a and a fourth groove turning portion 14b. The third groove turning portion 14a is disposed in the half-tread region containing the tread end E1 in the tire width direction with respect to the tire equator line CL, and the fourth groove turning portion 14b is disposed in the half-tread region containing the tread end E2 in the tire width direction with respect to the tire equator line CL. The third groove turning portion 14a and the fourth groove turning portion 14b will be described later.

The shoulder lug grooves 12A, 12B are disposed between adjacent center lug grooves 14 in the tire circumferential direction among the center lug grooves 14. That is, each of the shoulder lug grooves 12A, 12B is disposed in a tire circumferential position between adjacent center lug grooves in the tire circumferential direction among the center lug grooves 14. The shoulder lug grooves 12A expand outward in the tire width direction and toward one direction in the tire rotating direction C (upward in FIG. 2) in the half-tread region on the first side, and open at the tread end (ground contact end) E1. The shoulder lug grooves 12B expand outward in the tire width direction and toward the other direction in the tire rotating direction C (downward in FIG. 2) in the half-tread region on the second side, and open at the tread end (ground contact end) E2.

The ends of the shoulder lug grooves 12A, 12B on the inside in the tire width direction are positioned outside in the tire width direction with respect to the ends of the center lug grooves 14 in the tire width direction.

The width at the ends of the shoulder lug grooves 12A, 12B on the inside in the tire width direction is wider than the width of the circumferential primary grooves 11A, 11B.

The circumferential primary groove 11A is formed in a wavy shape over the entire periphery of the tire by alternately connecting ends of the center lug grooves 14 and the ends of the shoulder lug grooves 12A on the inside in the tire width direction in the half-tread region on the first side (the half-tread region between the tire equator line CL and the one tread end E1).

The circumferential primary groove 11B is formed in a wavy shape over the entire periphery of the tire by alternately connecting ends of the center lug grooves 14 and the ends of the shoulder lug grooves 12B on the inside in the tire width direction in the half-tread region on the second side (the half-tread region between the tire equator line CL and the other tread end E2). That is, the first groove turning portions 11a curved or bent outward in the tire width direction and the second groove turning portions 11b curved or bent inward in the tire width direction are disposed on the circumferential primary grooves 11A, 11B. The shoulder lug grooves 12A, 12B and the circumferential primary grooves 11A, 11B connect with each other at the first groove turning portions 11a, and the center lug grooves 14 and the circumferential primary grooves 11A, 11B connect with each other at the second groove turning portions 11b. Here, the wavy shapes of the circumferential primary grooves 11A, 11B indicate that the circumferential primary grooves 11A, 11B extend in the circumferential direction while meandering by changing their positions in the tire width direction.

The circumferential primary groove 11A is formed in a wavy shape over the entire periphery of the tire by arranging the first groove turning portions 11a that are ends connecting with the ends of the shoulder lug grooves 12A on the inside in the tire width direction and the second groove turning portions 11b that are ends connecting with ends of the center lug grooves 14 alternately in the tire circumferential direction.

The circumferential primary groove 11B is formed in a wavy shape over the entire periphery of the tire by arranging the first groove turning portions 11a that are ends connecting with the ends of the shoulder lug grooves 12B on the inside in the tire width direction and the second groove turning portions 11b that are ends connecting with ends of the center lug grooves 14 alternately in the tire circumferential direction.

The first groove turning portions 11a and the second groove turning portions 11b may be bent such that the circumferential primary grooves 11A, 11B have corners or may be curved such that the circumferential primary grooves 11A, 11B are curved. The corner shape includes a shape bent with a predetermined radius of curvature. The sections of the circumferential primary grooves 11A, 11B other than the first groove turning portions 11a and the second groove turning portions 11b may be straight or curved. If the sections other than the first groove turning portions 11a and the second groove turning portion 11b are curved, the sections and the turning portions may be curved with the same radius of curvature. One of two adjacent first groove turning portions 11a and two adjacent second groove turning portions 11b in the tire circumferential direction may be a groove turning portion that is formed to be bent by connecting a straight line and a curved groove, and the other may be a curved groove turning portion.

The circumferential primary grooves 11A, 11B have a narrower width than the width of the shoulder lug grooves 12A, 12B. Preferably, the width of the circumferential primary grooves 11A, 11B is, for example, 7 mm or greater and 20 mm or less.

The first groove turning portions 11a on the circumferential primary groove 11A and the first groove turning portions 11a on the circumferential primary groove 11B are shifted in position in the tire circumferential direction. In other words, the first groove turning portions 11a on the circumferential primary groove 11A and the first groove turning portions 11a on the circumferential primary groove 11B are arranged alternately in the tire circumferential direction.

Similarly, the second groove turning portions 11b on the circumferential primary groove 11A and the second groove turning portions 11b on the circumferential primary groove 11B are shifted in position in the tire circumferential direction. In other words, the second groove turning portions 11b on the circumferential primary groove 11A are positioned between the second groove turning portions 11b on the circumferential primary groove 11B in the tire circumferential direction. This configuration allows a shift in phase between the wavy shapes of the circumferential primary groove 11A and the circumferential primary groove 11B.

The center blocks 20 are defined by the above-described center lug grooves 14 and the circumferential primary grooves 11A, 11B so as to be aligned in the tire circumferential direction.

Figure 3:
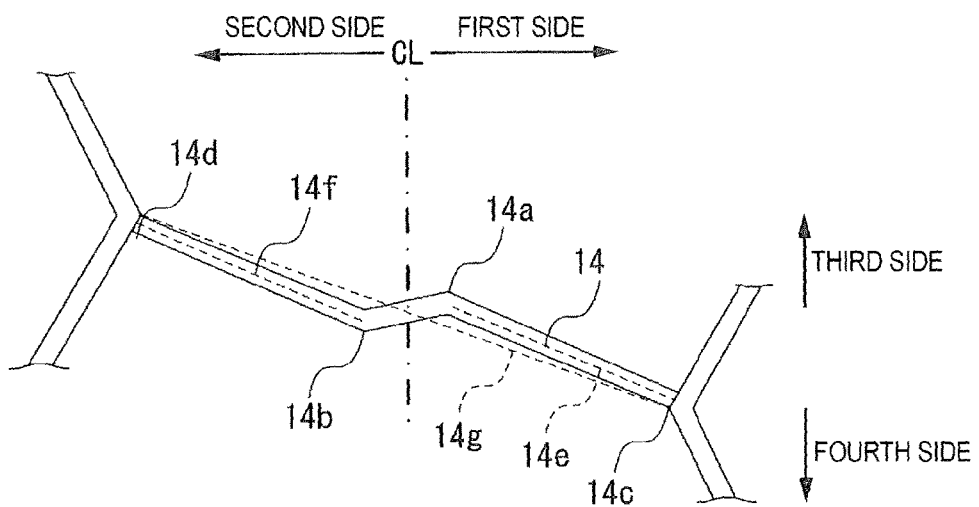
FIG. 3 is an enlarged view of a center lug groove of the tire according to the embodiment.

FIG. 3 illustrates a specific shape of the center lug grooves 14 in FIG. 2. As illustrated in FIG. 3, the third groove turning portion 14a of the center lug groove 14 is bent or curved so as to protrude toward a third side in the tire circumferential direction (the upper side in FIG. 3) on the first side (the right side in FIG. 3) with respect to the tire equator line CL.

The fourth groove turning portion 14b of the center lug groove 14 is bent or curved so as to protrude toward a fourth side that is opposite to the third side in the tire circumferential direction (the lower side in FIG. 3), on the second side (the left side in FIG. 3) with respect to the tire equator line CL. Here, a first connection end 14c at which the center lug groove 14 connects with the circumferential primary groove 11A on the first side and a second connection end 14d at which the center lug groove 14 connects with the circumferential primary groove 11B on the second side are tips of the circumferential primary grooves 11 on the inside in the tire width direction, that is, the second groove turning portions 11b, 11b. The second connection end 14d of the center lug groove 14 is positioned on the third side in the tire circumferential direction (the upper side in FIG. 3) with respect to the first connection end 14c.

Concerning the central position of the center lug groove 14 in the groove width direction, the inclination angle of a first straight line 14e connecting between a protruding end toward the third side in the tire circumferential direction (the upper side in FIG. 3) of the third groove turning portion 14a and the first connection end 14c with respect to the tire width direction and the inclination angle of a second straight line 14f connecting between a protruding end toward the fourth side in the tire circumferential direction of the fourth groove turning portion 14b and the second connection end 14d with respect to the tire width direction are greater than the inclination angle of a third straight line 14g connecting between the first connection end 14c and the second connection end 14d of the center lug groove 14 with respect to the tire width direction.

In a preferred aspect of the present embodiment, concerning the central position of the center lug groove 14 in the groove width direction, a section of the center lug groove 14 between the protruding end toward the third side in the tire circumferential direction of the third groove turning portion 14a and the first connection end 14c is on the first straight line 14e or on the third side with respect to the first straight line 14e, and a section of the center lug groove 14 between the protruding end toward the fourth side in the tire circumferential direction of the fourth groove turning portion 14b and the second connection end 14d is on the second straight line 14f or on the fourth side with respect to the second straight line 14f, as illustrated in FIGS. 2, 3.

Forming the center blocks 20 in this way enhances tread rigidity of the center blocks 20. That is, the center blocks 20 each have an anisotropic shape defined by the center lug grooves 14 inclined in one direction with respect to the tire width direction. When the center block 20 is separated from a road surface and pushed off from a tire contact surface, the anisotropic shape twists the center block 20 clockwise or anticlockwise and deforms the center block 20. At this time, the circumferential grooves 11 having a narrow width allow the center block 20 to engage with shoulder blocks adjacent in the tire width direction across the circumferential primary grooves 11A, 11B at the first groove turning portions 11a, 11a and to function integrally, resulting in an enhancement in tread rigidity of the center block 20. The enhanced tread rigidity of the center block 20 prevents the center block 20 from being twisted and prevents local wear of the center block 20 on both sides of the center lug grooves 14 in the tire circumferential direction.

The third and fourth groove turning portions 14a, 14b can further enhance tread rigidity of the center block 20. That is, when the center block 20 is separated and pushed off from a road surface, shear force is applied from the road surface to the center block 20 in the tire circumferential direction and thus deforms the center block 20 to fall. At this time, adjacent center blocks 20 in the circumferential direction engage with each other at the third and fourth groove turning portions 14a, 14b of the center lug groove 14 and function integrally to generate counter force, resulting in an enhancement in tread rigidity of the center block 20. The enhanced tread rigidity of the center block 20 prevents the center block 20 from falling and prevents local wear of the center block 20 on both sides of the center lug grooves 14 in the tire circumferential direction.

The both-end-closed grooves 16 are disposed in regions enclosed by the circumferential primary grooves 11A, 11B and the center lug grooves 14. The both-end-closed grooves 16 are provided in this embodiment but may not be provided.

The both-end-closed grooves 16 each have both ends in positions separated from the circumferential primary grooves 11A, 11B and the center lug grooves 14 and extend in the tire width direction. The both-end-closed grooves 16 thus provided increase the edge component thereof, resulting in an enhancement in traction performance of the tire.

As illustrated in FIG. 2, the extending direction of the both-end-closed grooves 16 may be inclined with respect to the tire width direction. In specific, the inclination angle $\theta$ of the both-end-closed grooves 16 with respect to the tire circumferential direction is preferably 70° or greater and 90° or less, or 70° or greater and less than 90°. The angle $\theta$ in this range increases edges of the both-end-closed grooves 16 with respect to the tire circumferential direction, resulting in an enhancement in traction performance.

In this embodiment, the maximum width W1 of the both-end-closed grooves 16 is preferably 15 mm≤W1≤25 mm. A width W1 less than 15 mm does not allow the edges of the both-end-closed grooves 16 to contribute to enhancement in traction performance. A width W1 greater than 25 mm decreases rigidity of the center blocks 20, resulting in further falling of the center blocks 20.

The maximum width W1 of the both-end-closed grooves 16 is greater than the maximum width W2 of the center lug grooves 14. Preferably, a relationship of, for example, 1.20≤W1/W2≤2.50 is satisfied. If the center lug grooves 14 have such a wide maximum width W2 that satisfies a relationship of W1/W2<1.20, the engagement of adjacent center blocks 20 in the circumferential direction decreases, resulting in a decrease in tread rigidity of the center blocks 20. If the center lug grooves 14 have such a narrow maximum width W2 that satisfies a relationship of W1/W2>2.50, the edges of the center lug grooves 14 do not contribute to enhancement in traction performance. Preferably, the maximum width W2 of the center lug grooves 14 is, for example, 7 mm or greater and 20 mm or less.

The maximum depth D2 of the both-end-closed grooves 16 is less than the maximum depth D3 of the center lug grooves 14. Preferably, a relationship of, for example, $0.5 \leq D2/D3 \leq 1.0$ is satisfied. A relationship of $D2/D3<0.5$ cannot ensure sufficient traction performance with the edges of the both-end-closed grooves 16. A relationship of $D2/D3>1.0$ provides insufficient rigidity of the center blocks 20 and thus cannot prevent the center blocks 20 from falling.

The maximum width WB of the center blocks 20 in the tire width direction and the tread width T of the tread portion 2 in the tire width direction preferably satisfy a relationship of $0.35 \leq WB/T \leq 0.55$ and more preferably $0.40 \leq WB/T \leq 0.50$. Here, the maximum width WB of the center blocks 20 in the tire width direction indicates a distance between an end of the center blocks 20 closest to the tread end E1 and an end closest to the tread end E2 in the tire width direction. The tread width T indicates a length along the outer shape of the tread portion 2 between the tread ends E1, E2. A relationship of $WB/T<0.35$ increases the length of the shoulder lug grooves 12A, 12B that are wider than the center lug grooves and thus cannot ensure a sufficient contact area of the tread portion 2. A relationship of $WB/T>0.55$ decreases the length of the shoulder lug grooves 12A, 12B and thus cannot ensure sufficient traction performance with the edges of the shoulder lug grooves 12A, 12B.

The maximum length L1 of the both-end-closed grooves 16 in the tire width direction preferably satisfies a relationship of $0.3 \leq L1/WB \leq 0.6$ and more preferably $0.4 \leq L1/WB \leq 0.5$. A relationship of $L1/WB<0.4$ cannot ensure sufficient traction performance with the edges of the both-end-closed grooves 16. A relationship of $L1/WB>0.5$ increases the area of the both-end-closed grooves 16 and thus cannot ensure a sufficient contact area of the center blocks 20.

A waving range A of the circumferential primary grooves 11A, 11B preferably satisfies a relationship of $0.3 \leq A/L1 \leq 0.5$. Here, the waving range of the circumferential primary grooves 11A, 11B indicates a distance, in the tire width direction, between the outermost position of each of the circumferential primary grooves 11A, 11B in the tire width direction at the first groove turning portions 11a and the innermost position in the tire width direction at the second groove turning portions 11b. A relationship of $A/L1<0.3$ cannot ensure sufficient traction performance with the edges of the circumferential primary grooves 11A, 11B. A relationship of $A/L1>0.5$ increases the area of the circumferential primary grooves 11A, 11B and thus cannot ensure a sufficient contact area of the tread portion 2.

The circumferential primary grooves 11A, 11B preferably include raised bottom portions 11c formed by partially making the groove depth shallow.

Figure 4:
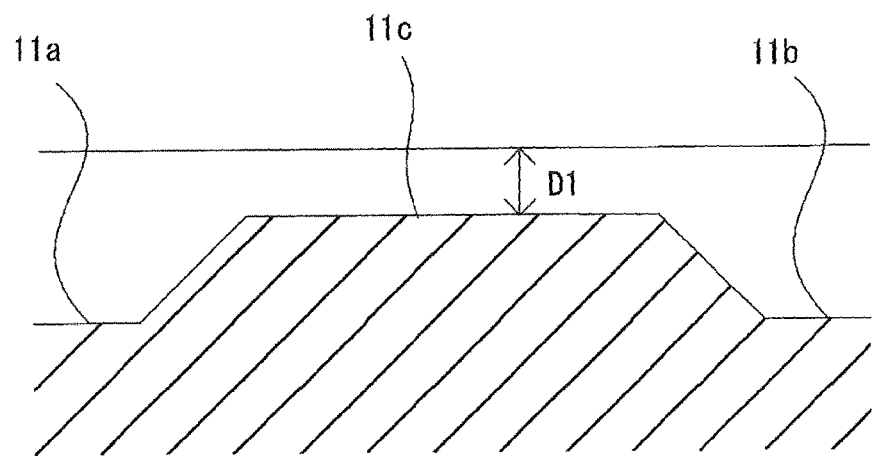
FIG. 4 illustrates an example raised bottom portion in a circumferential primary groove of the tire according to the embodiment.

FIG. 4 is a cross-sectional view of an example of the circumferential primary groove 11A provided with the raised bottom portion 11c, between the first groove turning portion 11a and the second groove turning portion 11b. The circumferential primary groove 11B may be provided with the same raised bottom portion 11c. As illustrated in FIG. 4, the raised bottom portion 11c is disposed between the first groove turning portion 11a and the second groove turning portion 11b. In FIG. 4, the circumferential primary grooves 11A, 11B are deepest at the first groove turning portion 11a and the second groove turning portion 11b and are shallower at the raised bottom portion 11c than at the first groove turning portion 11a and the second groove turning portion 11b. The deepest sections of the circumferential primary grooves 11A, 11B are preferably as deep as the shoulder lug grooves 12A, 12B.

The raised bottom portions 11c provided in the circumferential primary grooves 11A, 11B increase rigidity of shoulder blocks 21A enclosed by the shoulder lug grooves 12A and the circumferential primary groove 11A, the center blocks 20, and shoulder blocks 21B enclosed by the shoulder lug grooves 12B and the circumferential primary groove 11B, resulting in a prevention of uneven wear. The increased rigidity prevents the shoulder blocks 21A, 21B and the center blocks 20 from falling, prevents a decrease in edge component due to the falling, and can thus maintain traction performance.

The raised bottom portions 11c may be disposed at the first and second groove turning portions 11a, 11b. The deepest sections of the circumferential primary grooves 11A, 11B are preferably as deep as the shoulder lug grooves 12.

The raised bottom portions 11c may have a constant depth or different depths. For example, the raised bottom portions 11c may be shallower in a stepwise manner from the deepest sections of the circumferential primary grooves 11A, 11B or may be shallower continuously from the deepest sections.

At this time, the shallowest depth D1 of the raised bottom portions 11c preferably satisfies a relationship of $D1/T<0.05$. A relationship of $D1/T \geq 0.05$ does not allow the raised bottom portions 11c to sufficiently prevent the center blocks 20 from falling. The lower limit of D1/T is not limited but is preferably greater than 0.01 and more preferably 0.02 or greater.

The anisotropic center blocks 20 are disposed in regions enclosed by the circumferential primary grooves 11A, 11B and the center lug grooves 14 inclined in one direction with respect to the tire width direction and the tire circumferential direction as described above, such that the center blocks 20 have enhanced tread rigidity. This configuration can at least maintain traction performance and enhance wear resistance in the tread central region.

The both-end-closed grooves 16 having both ends separated from the circumferential primary grooves 11A, 11B and the center lug grooves 14 and extending in the tire width direction increase the edge component of the both-end-closed grooves 16, resulting in an enhancement in traction performance of the tire. The maximum width W1 of the both-end-closed grooves 16 within a range of $15 \text{ mm} \leq W1 \leq 25 \text{ mm}$ can enhance traction performance with the edges of the both-end-closed grooves 16 without a decrease in rigidity of the center blocks 20.

First Modified Example

Figure 5:
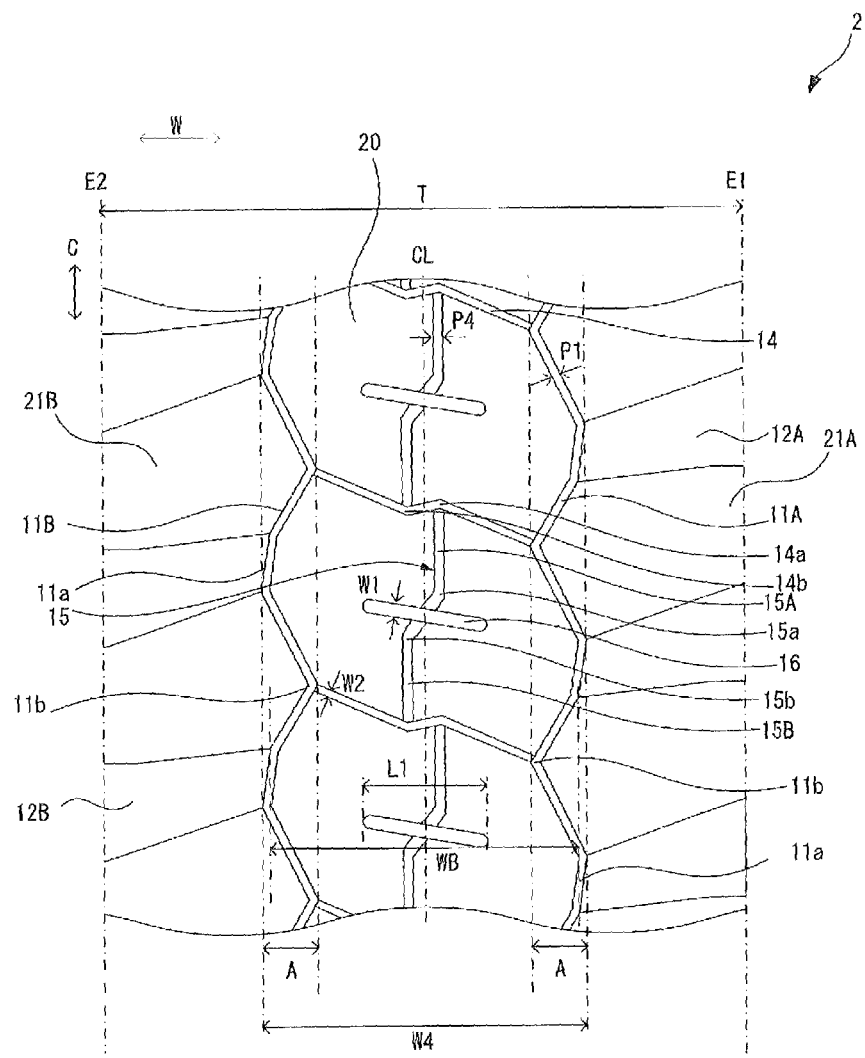
FIG. 5 is a planar development diagram of a modified example of the tread pattern of the tire according to the embodiment.

FIG. 5 is a planar development diagram of a modified example of the tread pattern illustrated in FIG. 2. As illustrated in FIG. 5, a circumferential secondary groove 15 extending from the intermediate section of the both-end-closed grooves 16 on both sides in the tire circumferential direction is disposed in each of the center block 20 regions enclosed by the circumferential primary grooves 11A, 11B and the center lug grooves 14 inclined in one direction with respect to the tire width direction and the tire circumferential direction. The example in FIG. 5 is provided with the both-end-closed grooves 16; however, the both-end-closed grooves 16 may not be provided.

As in the embodiment illustrated in FIGS. 2, 3, the center blocks 20 are defined by the circumferential grooves 11A, 11B including the first and second groove turning portions 11a, 11b and the center lug grooves 14 including the third and fourth groove turning portions 14a, 14b.

The circumferential secondary groove 15 includes a portion 15A and a portion 15B, connects adjacent center lug grooves 14 in the tire circumferential direction among the center lug grooves 14, and is shallower than the depth of the circumferential primary grooves 11A, 11B. The portion 15A connects with one of the adjacent center lug grooves 14, and the portion 15B connects with the other of the adjacent center lug grooves 14.

Preferably, the portions 15A, 15B of the circumferential secondary groove 15 connect with the center lug grooves 14 in positions in a region between and inclusive of the third groove turning portion 14a and the fourth groove turning portion 14b in the tire width direction.

As illustrated in FIG. 5, the circumferential secondary groove 15 preferably includes groove turning portions 15a, 15b that are curved or bent.

The portion 15A of the circumferential secondary groove 15 extends from the intermediate section of the both-end-closed groove 16 toward one side in the tire circumferential direction (upward in FIG. 5) and connects with the third groove turning portion 14a of the center lug groove 14. The portion 15A of the circumferential secondary groove 15 has the groove turning portion 15a. The portion 15A is disposed parallel to the tire circumferential direction between the groove turning portion 15a and the third groove turning portion 14a.

The portion 15B of the circumferential secondary groove extends from the intermediate section of the both-end-closed groove 16 toward the other side in the tire circumferential direction (downward in FIG. 5) and connects with the fourth groove turning portion 14b of the center lug groove 14. The portion 15B of the circumferential secondary groove 15 has the groove turning portion 15b. The portion 15B is disposed parallel to the tire circumferential direction between the groove turning portion 15b and the fourth groove turning portion 14b.

Figure 6:
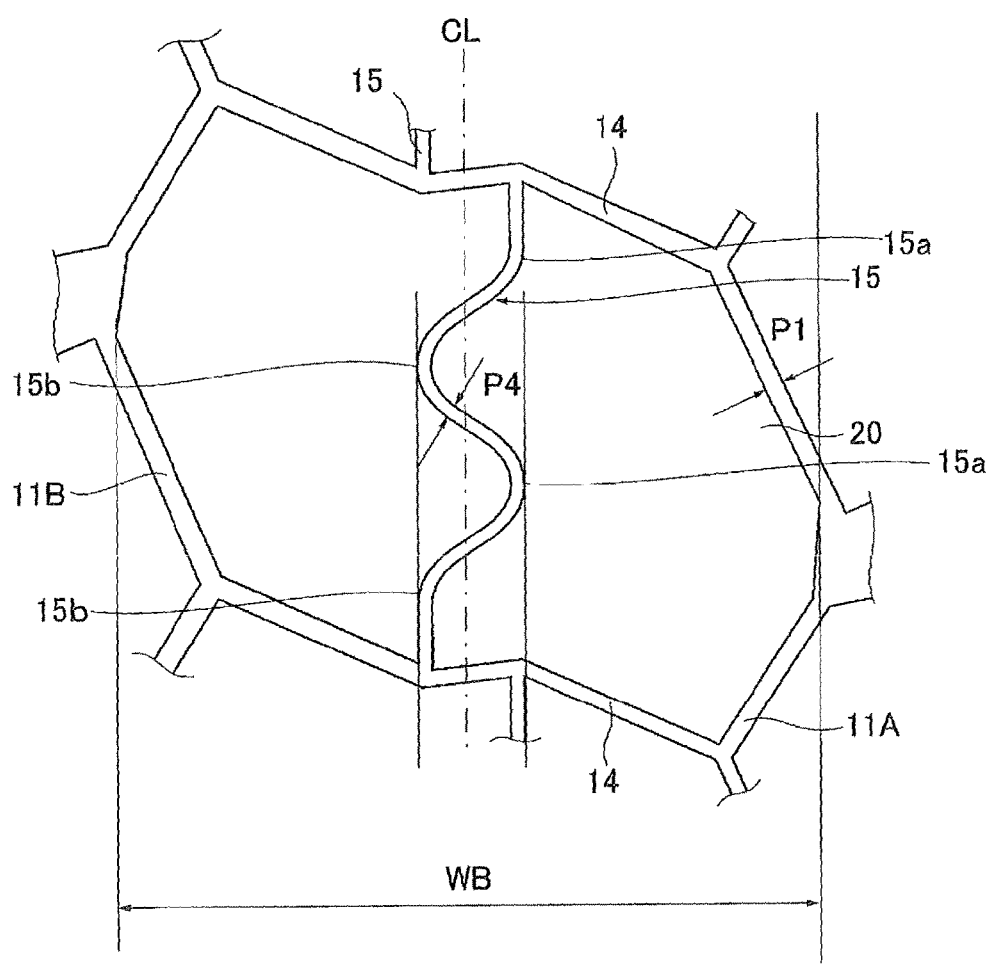
FIG. 6 is a planar development diagram of another modified example of the tread pattern of the tire according to the embodiment.

The circumferential secondary groove 15 is provided with the groove turning portions 15a, 15b that are bent in the example in FIG. 5 but may be provided with curved groove turning portions 15a, 15b as illustrated in FIG. 6. FIG. 6 illustrates a different example of the circumferential secondary groove 15.

A ratio P4/P1 of a width P4 of the circumferential secondary groove 15 (See FIGS. 5, 6) to a width P1 of the circumferential primary grooves 11A, 11B (See FIGS. 5, 6) is preferably 0.70 to 1.10. A ratio P4/P1 of 0.70 to 1.10 ensures heat dissipation of the circumferential secondary groove 15 equivalent to that of the circumferential primary grooves 11A, 11B and prevents a decrease in resistance to stone lodging with a narrow width of the circumferential secondary groove 15. Concerning the resistance to stone lodging, the target size of stones or foreign materials is not limited; however, the target is, for example, 2 to 20 mm stones or the like.

The circumferential secondary groove 15 meanders in the tire width direction as illustrated in FIG. 6, and a ratio of the maximum displacement value of the meandering of the circumferential secondary groove 15 to the maximum width WB of the center blocks is preferably 0.05 to 0.35. A ratio of 0.05 to 0.35 achieves good resistance to stone lodging and heat resistance in a compatible manner. A ratio of 0.05 or greater increases the surface area of the circumferential secondary groove 15 and thus enhances heat resistance. A ratio of 0.35 or less reduces opening and closing movement of the circumferential secondary groove 15 in the center block 20 region during tire rolling motion and thus enhances resistance to stone lodging.

The circumferential secondary groove 15 thus provided can weaken excessively high block rigidity of the center blocks 20. This configuration can prevent the tread portion 2 from having such a distorted outer shape that the curvature of the center region (the region with the center blocks 20) is extremely small and the curvature of the shoulder regions (the regions with the shoulder lug grooves 12) is significantly large in filling the tire with air and can thus reduce variation in the curvature of the outer shape of the tread portion 2 in the vicinities of the circumferential primary grooves 11A, 11B. This configuration can thus prevent local wear that readily occurs in a section where the curvature varies significantly.

Second Modified Example

Figure 7:
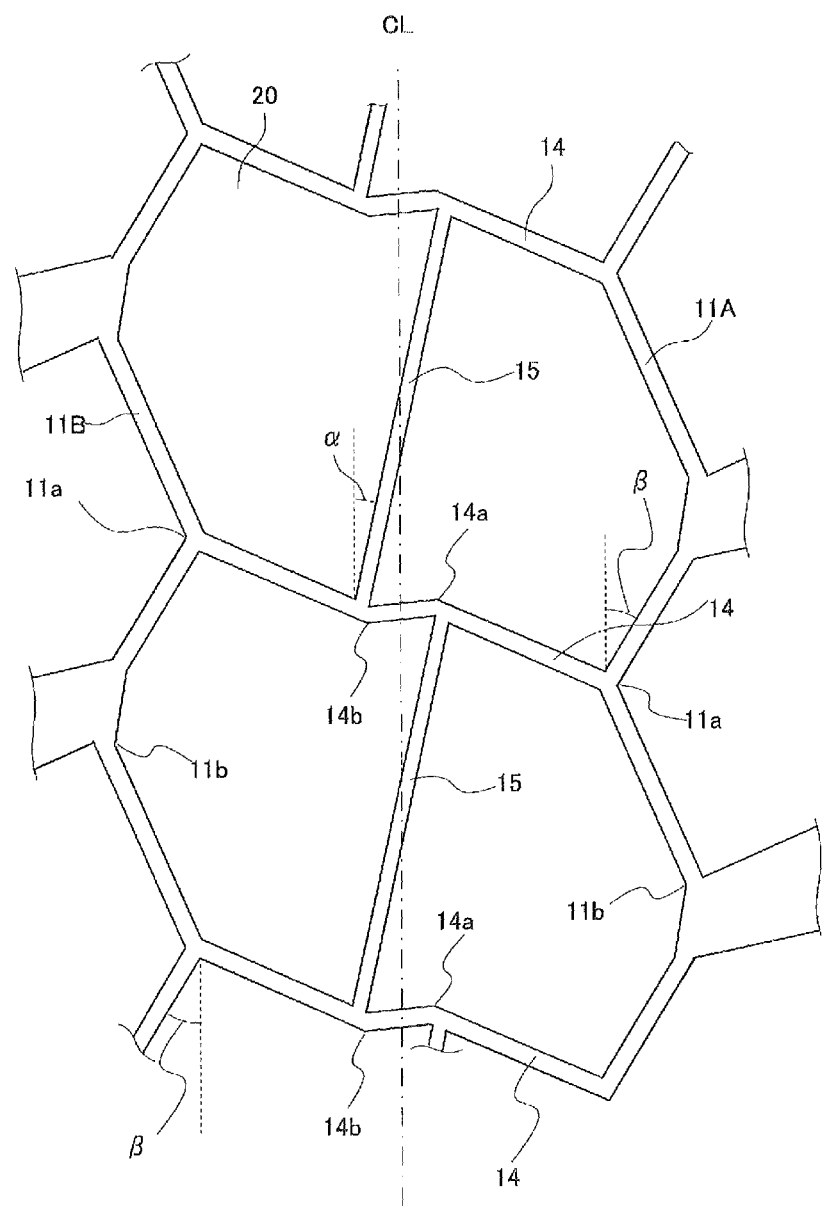
FIG. 7 is a planar development diagram of yet another modified example of the tread pattern of the tire according to the embodiment.

FIG. 7 is a planar development diagram of a modified example of the tread pattern illustrated in FIG. 2. As illustrated in FIG. 7, a circumferential secondary groove 15 connecting adjacent center lug grooves 14 in the tire circumferential direction is disposed in each of the center block 20 regions enclosed by the circumferential primary grooves 11A, 11B and the center lug grooves 14 inclined with respect to the tire width direction and the tire circumferential direction. The circumferential secondary groove 15 extends straight while being inclined with respect to the tire circumferential direction such that one of the connection ends of the circumferential secondary groove 15 connects with the third groove turning portion 14a and that the other of the connection ends of the circumferential secondary groove 15 connects with the fourth groove turning portion 14b. The inclination angle $\alpha$ of the circumferential secondary groove 15 with respect to the tire circumferential direction is different from the inclination angle $\beta$ of sections, inclined toward the same side in the tire width direction as the side toward which the circumferential secondary groove 15 is inclined, of the circumferential primary grooves 11A, 11B with respect to the tire circumferential direction. The absolute value $|\alpha-\beta|$ of the difference between the inclination angles is preferably 10° to 25°.

The mutually different inclination angle $\alpha$ and inclination angle $\beta$ increase variation in the lengths in the tire width direction of two sections of the center block 20 divided by the circumferential secondary groove 15 (the ground contact lengths in the tire width direction), in the tire circumferential direction. This configuration varies ground contact pressure during tire rolling motion and disperses the pressure in the tire circumferential direction, and accordingly does not tend to cause chipping in traveling on a bad road, resulting in an enhancement in chipping resistance. An absolute value $|\alpha-\beta|$ of 10° to 25° of the difference between the inclination angles varies ground contact pressure over the periphery of the tire, resulting in an enhancement in chipping resistance.

Third Modified Example

Figure 8:
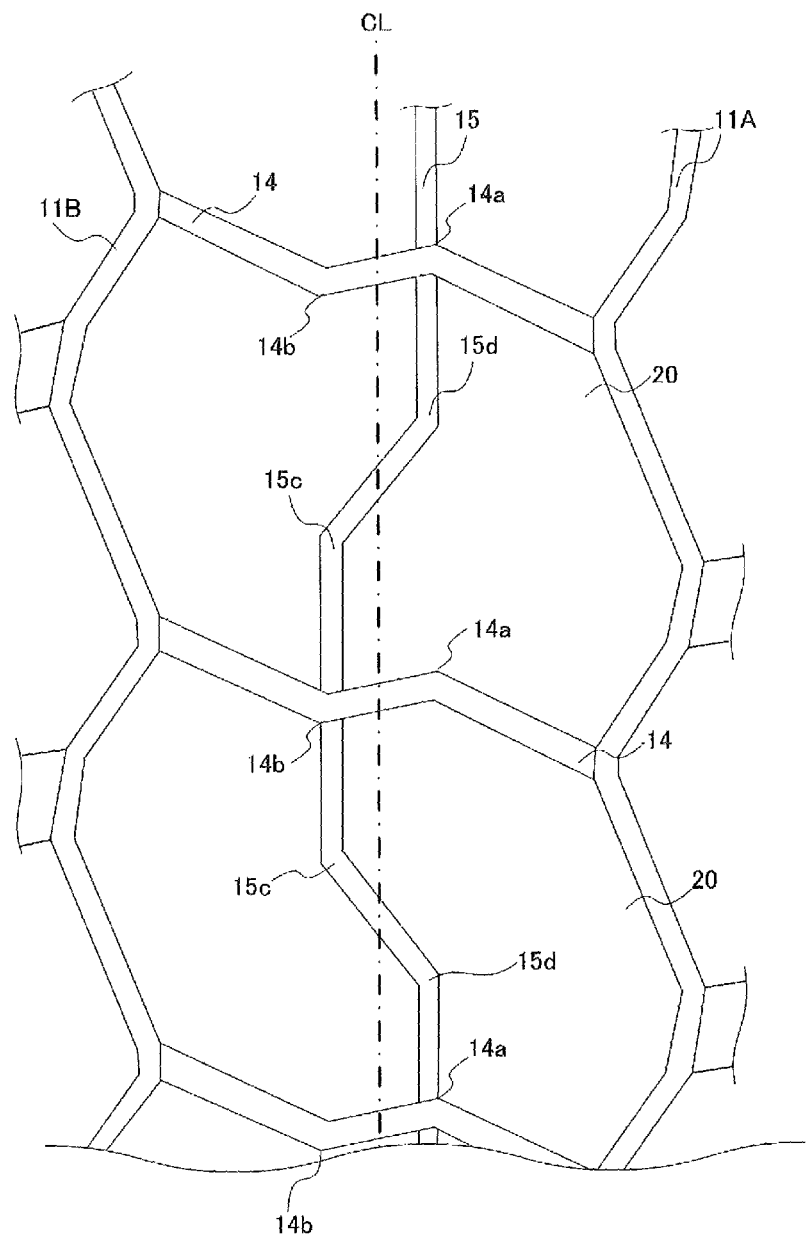
FIG. 8 is a planar development diagram of yet another modified example of the tread pattern of the tire according to the embodiment.

FIG. 8 is a planar development diagram of a modified example of the tread pattern illustrated in FIG. 2. As illustrated in FIG. 8, a single circumferential secondary groove 15 that is shallower than the circumferential primary grooves 11A, 11B is provided so as to extend over the entire periphery of the tire along the tire equator line CL. That is, the single circumferential secondary groove 15 is provided over the entire periphery of the tire in the center block 20 regions enclosed by the circumferential primary grooves 11A, 11B and the center lug grooves 14 inclined with respect to the tire width direction and the tire circumferential direction. The circumferential secondary groove 15 intersects the center lug grooves 14 so as to penetrate the center lug grooves 14 in regions between and inclusive of the third groove turning portions 14a and the fourth groove turning portions 14b in the tire width direction.

In this modified example, the circumferential secondary groove 15 disposed in the center block 20 regions can enhance resistance to heat buildup in the center blocks 20.

As illustrated in FIG. 8, the circumferential secondary groove 15 includes, on the periphery of the tire, fifth groove turning portions 15c that are curved or bent and sixth groove turning portions 15d that are curved or bent. When the tread pattern is viewed from the outside toward the inside in the tire radial direction in traveling toward the third side in the tire circumferential direction (upward in FIG. 8), the fifth groove turning portions 15c change their direction clockwise, and the sixth groove turning portions 15d change their direction counterclockwise. Each of sections of the circumferential secondary groove 15 between adjacent center lug grooves 14 among the center lug grooves 14 is preferably provided with one of the fifth groove turning portions 15c and one of the sixth groove turning portions 15d. The circumferential secondary groove 15 is preferably shallower than the center lug grooves 14 as illustrated in FIG. 8.

Preferably, the circumferential secondary groove 15 is provided with pairs of two successive fifth groove turning portions 15c and pairs of two successive sixth groove turning portions 15d in the tire circumferential direction, and the center lug grooves 14 intersect between the two successive fifth groove turning portions 15c, 15c and between the two successive sixth groove turning portions 15d, 15d.

Preferably, the circumferential secondary groove 15 is provided, over the periphery of the tire, with a plurality of sets of one of the fifth groove turning portions 15c, another of the fifth groove turning portions 15c, one of the sixth groove turning portions 15d, and another of the sixth groove turning portions 15d that are arranged successively in the tire circumferential direction, and a section between the one fifth groove turning portion 15c and the other fifth groove turning portion 15c and a section between the one sixth groove turning portion 15d and the other sixth groove turning portion 15d, of the circumferential secondary groove 15 are straight grooves extending parallel to the tire equator line CL.

Figure 9:
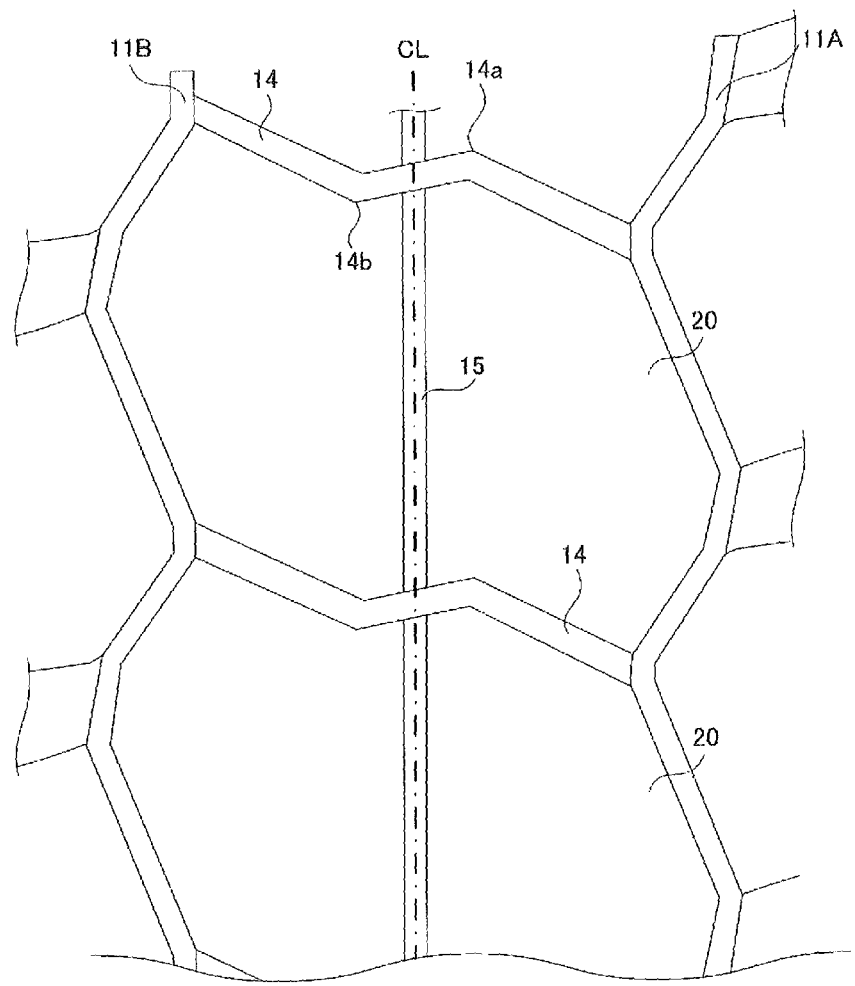
FIG. 9 is a planar development diagram of yet another modified example of the tread pattern of the tire according to the embodiment.

FIG. 9 illustrates a different example of the circumferential secondary groove 15 from that in FIG. 8. As in the example in FIG. 8, the example in FIG. 9 is provided with a single circumferential secondary groove 15 that is shallower than the circumferential primary grooves 11A, 11B and extends over the entire periphery of the tire along the tire equator line CL. That is, the single circumferential secondary groove 15 is provided over the entire periphery of the tire in the center block 20 regions enclosed by the circumferential primary grooves 11A, 11B and the center lug grooves 14 inclined in one direction with respect to the tire width direction and the tire circumferential direction. The circumferential secondary groove 15 intersects the center lug grooves 14 so as to penetrate the center lug grooves 14 in regions between and inclusive of the third groove turning portions 14a and the fourth groove turning portions 14b in the tire width direction. The circumferential secondary groove 15 has such a narrow width as to be disposed in the regions between the third groove turning portions 14a and the fourth groove turning portions 14b. In other words, the width of the circumferential secondary groove 15 is less than the separation distance between the third groove turning portions 14a and the fourth groove turning portions 14b.

This example provided with the circumferential secondary groove 15 illustrated in FIG. 9 can prevent a decrease in resistance to stone lodging in the tread central region and enhance resistance to heat buildup.

Preferably, the intersecting points of the circumferential secondary groove 15 and the center lug grooves 14 are in regions between and inclusive of the third groove turning portions 14a and the fourth groove turning portions 14b in the tire width direction. The circumferential secondary groove 15 is preferably shallower than the center lug grooves 14 as illustrated in FIG. 9.

Figure 10:
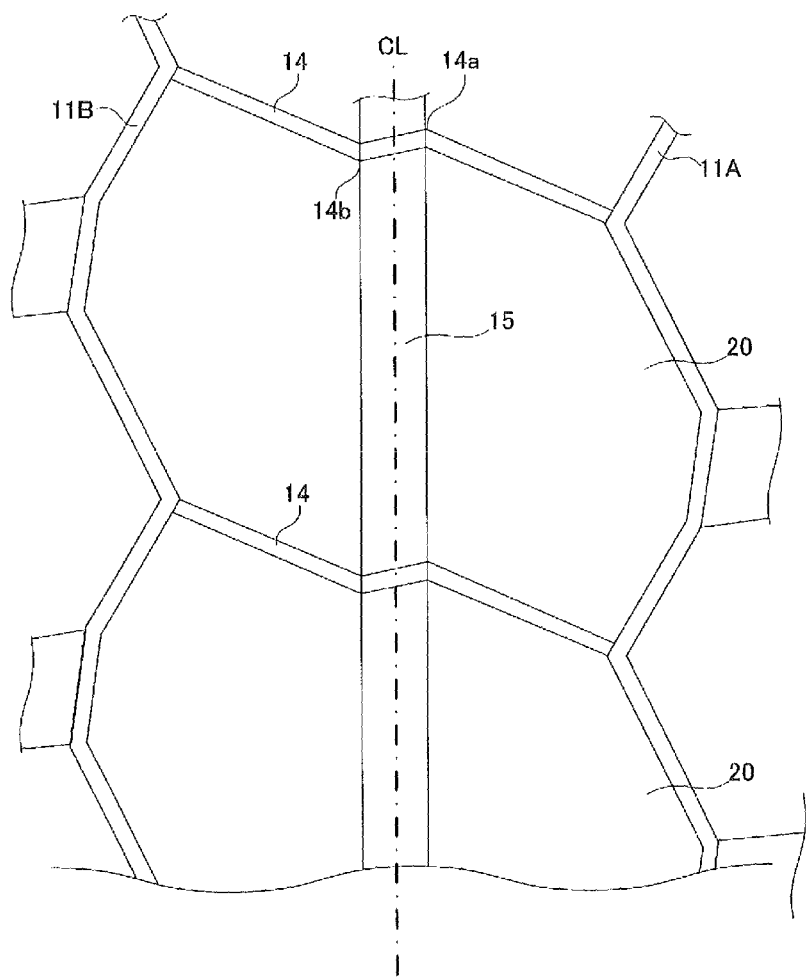
FIG. 10 is a planar development diagram of yet another modified example of the tread pattern of the tire according to the embodiment.

FIG. 10 illustrates a different example of the circumferential secondary groove 15 from those in FIGS. 8, 9. As in the example in FIG. 8, the example in FIG. 10 is provided with a single circumferential secondary groove 15 that is shallower than the circumferential primary grooves 11A, 11B and extends over the entire periphery of the tire along the tire equator line CL. That is, the single circumferential secondary groove 15 is provided over the entire periphery of the tire in the center block 20 regions enclosed by the circumferential primary grooves 11A, 11B and the center lug grooves 14 inclined in one direction with respect to the tire width direction and the tire circumferential direction. The circumferential secondary groove 15 intersects the center lug grooves 14 so as to penetrate the center lug grooves 14 in regions containing the third groove turning portions 14a and the fourth groove turning portions 14b in the tire width direction. The circumferential secondary groove 15 has such a wide width as to be disposed over the third groove turning portions 14a and the fourth groove turning portions 14b. In other words, the width of the circumferential secondary groove 15 is equal to or greater than the separation distance between the third groove turning portions 14a and the fourth groove turning portions 14b. This example provided with the circumferential secondary groove 15 illustrated in FIG. 10 can prevent a decrease in resistance to stone lodging in the tread central region and enhance resistance to heat buildup.

The circumferential secondary groove 15 is preferably shallower than the center lug grooves 14 as illustrated in FIG. 10.

Experiment 1

Various tires having different tread patterns were prepared to check effect of a tread pattern that was the same as the tread pattern illustrated in FIG. 2 but not provided with the circumferential secondary groove 15 and the both-end-closed grooves 16. Wear resistance in the tread central region and traction performance were checked. The size of the prepared tires was 46/90R57. The tires were mounted on 29.00-6.0 rims (TRA specified rim). A 200-ton dump truck with the tires traveled on the same off-road surface under test conditions of an air pressure of 700 kPa (TRA specified air pressure) and an applied load of 617.81 kN (TRA specified load) to test uneven wear resistance and traction. Uneven wear resistance indicates a quantitative relationship of wear in the tread central region to wear in the tread shoulder regions.

After the truck traveled for 5000 hours, a quantitative ratio of wear in the tread central region to wear in the tread shoulder regions was measured. Uneven wear resistance was indexed using the inverse of the ratio with reference to a quantitative ratio of wear in the tread central region to wear in the tread shoulder regions in Conventional Example described later (index of 100). A greater index indicates better uneven wear resistance.

In the traction test, a distance until a vehicle with the tires in new condition fitted thereto stopped when traveling at a speed of 40 km/hour was measured. The measurement result indicates braking performance, which can also be determined as traction performance. The measurement result was indexed using its inverse with reference to a measurement result of Conventional Example described later (index of 100). A greater index indicates better traction performance.

The tires were prepared for Conventional Example, Working Example, and Comparative Example.

Figure 11:
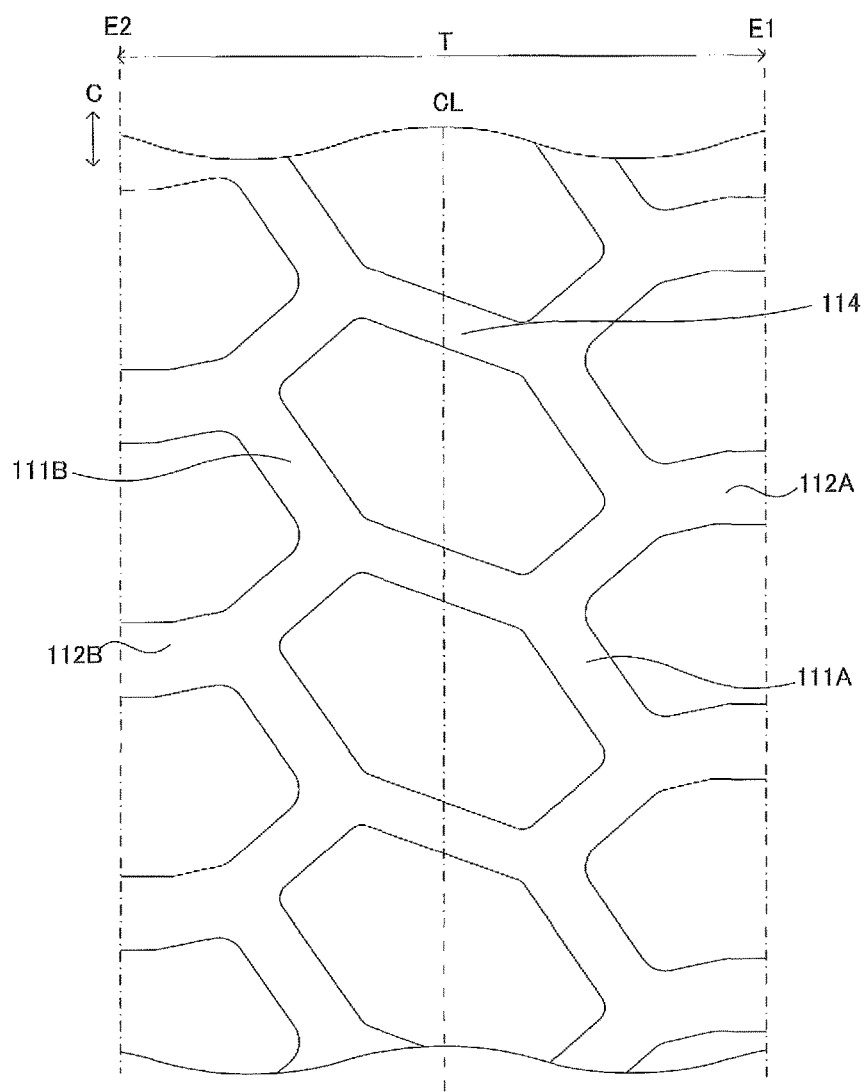
FIG. 11 illustrates a tread pattern of a conventional tire.

FIG. 11 illustrates a tread pattern of Conventional Example. The tread pattern illustrated in FIG. 11 includes a pair of circumferential primary grooves 111A, 111B, shoulder lug grooves 112A, 112B, and center lug grooves 114. The circumferential primary grooves 111A, 111B, the shoulder lug grooves 112A, 112B, and the center lug grooves 114 respectively have similar configurations to the circumferential primary grooves 11A, 11B, the shoulder lug grooves 12A, 12B, and the center lug grooves 14; however, the circumferential primary grooves 111A, 111B and the shoulder lug grooves 112A, 112B have the same width as that of the shoulder lug grooves 12A, 12B. Both-end-closed grooves are not provided in land portions enclosed by the circumferential primary grooves 111A, 111B and the center lug grooves 114.

Working Example has a tread pattern that includes the circumferential primary grooves 11A, 11B, the center lug grooves 14 inclined in one direction with respect to the tire circumferential direction and the tire width direction and provided with the third groove turning portions 14a and the fourth groove turning portions 14b, and the shoulder lug grooves 12A, 12B as illustrated in FIG. 2 and that is not provided with the circumferential secondary grooves 15 and the both-end-closed grooves 16.

Comparative Example has a tread pattern that includes the circumferential primary grooves 11A, 11B, the center lug grooves 14 inclined in one direction with respect to the tire circumferential direction and the tire width direction, and the shoulder lug grooves 12A, 12B as in Working Example but does not include the third groove turning portions 14a and the fourth groove turning portions 14b in the center lug grooves 14. Table 1 below shows test results.

TABLE 1

|  | Conventional Example | Working Example | Comparative Example |
| --- | --- | --- | --- |
| Uneven wear resistance | 100 | 111 | 103 |
| Traction performance | 100 | 101 | 100 |

The results in Table 1 above confirms that the tread pattern with the third groove turning portions 14a and the fourth groove turning portions 14b provided in the center lug grooves at least maintains traction performance and enhances uneven wear resistance.

Experiment 2

Various tires having different tread patterns were prepared to check effect of a tread pattern according to the embodiment provided with the both-end-closed grooves illustrated in FIGS. 2, 5. Traction performance was checked. The size of the prepared tires was the same as that in Experiment 1, 46/90R57. The tires were mounted on 29.00-6.0 rims (TRA specified rim). A 200-ton dump truck with the tires traveled on the same off-road surface under test conditions of an air pressure of 700 kPa (TRA specified air pressure) and an applied load of 617.81 kN (TRA specified load) to test traction performance.

In the traction performance test, a braking distance when the 200-ton dump truck with the tires in new condition fitted thereto traveled on a level road at a speed of 50 km/hour was measured. The measurement result was indexed using its inverse with reference to a measurement result of Conventional Example described later (index of 100). A greater index indicates better traction performance.

The tires were prepared for Conventional Example, Working Examples 1 to 35, and Comparative Examples 1 to 7.

FIG. 11 illustrates a tread pattern of Conventional Example. The tread pattern illustrated in FIG. 11 includes a pair of circumferential primary grooves 111A, 111B, shoulder lug grooves 112A, 112B, and center lug grooves 114. The circumferential primary grooves 111A, 111B, the shoulder lug grooves 112A, 112B, and the center lug grooves 114 respectively have similar configurations to the circumferential primary grooves 11A, 11B, the shoulder lug grooves 12A, 12B, and the center lug grooves 14; however, the circumferential primary grooves 111A, 111B and the shoulder lug grooves 112A, 112B have the same width as that of the shoulder lug grooves 12A, 12B. Both-end-closed grooves are not provided in land portions enclosed by the circumferential primary grooves 111A, 111B and the center lug grooves 114.

The tread pattern illustrated in FIG. 2 or FIG. 5 was used for Working Examples 1 to 35 and Comparative Examples 1, 2.

Tables 2, 3 below show specifications of the tread patterns and evaluation results of traction performance of the tread patterns.

TABLE 2

|  | Conventional Examples | Comparative Example | | Working Examples | | |
| --- | --- | --- | --- | --- | --- | --- |
|  |  | 1 | 2 | 1 | 2 | 3 |
| First and second groove turning portions of circumferential primary grooves | Presence | Presence | Presence | Presence | Presence | Presence |
| Both-end-closed grooves | Absence | Presence | Presence | Presence | Presence | Presence |
| W1 (mm) | — | 10 | 30 | 15 | 20 | 25 |
| W1/W2 | — | 2.8 | 2.8 | 2.8 | 2.8 | 2.8 |
| Raised bottom portion | Absence | Absence | Absence | Absence | Absence | Absence |

TABLE 2-continued

|  |  |  |  |  |  |  |
|---|---|---|---|---|---|---|
| D1/T | — | — | — | — | — | — |
| D2/D3 | — | 0.3 | 0.3 | 0.3 | 0.3 | 0.3 |
| WB/T | 0.30 | 0.30 | 0.30 | 0.30 | 0.30 | 0.30 |
| L1/WB | 0.7 | 0.7 | 0.7 | 0.7 | 0.7 | 0.7 |
| A/L1 | 0.6 | 0.6 | 0.6 | 0.6 | 0.6 | 0.6 |
| θ (°) | — | 60 | 60 | 60 | 60 | 60 |
| Traction | 100 | 101 | 101 | 104 | 106 | 104 |

|  | Working Examples |  |  |  |  |  |
|---|---|---|---|---|---|---|
|  | 4 | 5 | 6 | 7 | 8 | 9 |
| First and second groove turning portions of circumferential primary grooves | Presence | Presence | Presence | Presence | Presence | Presence |
| Both-end-closed grooves | Presence | Presence | Presence | Presence | Presence | Presence |
| W1 (mm) | 20 | 20 | 20 | 20 | 20 | 20 |
| W1/W2 | 1 | 1.2 | 1.8 | 2.5 | 1.8 | 1.8 |
| Raised bottom portion | Absence | Absence | Absence | Absence | Presence | Presence |
| D1/T | — | — | — | — | 0.01 | 0.02 |
| D2/D3 | 0.3 | 0.3 | 0.3 | 0.3 | 0.3 | 0.3 |
| WB/T | 0.30 | 0.30 | 0.30 | 0.30 | 0.30 | 0.30 |
| L1/WB | 0.7 | 0.7 | 0.7 | 0.7 | 0.7 | 0.7 |
| A/L1 | 0.6 | 0.6 | 0.6 | 0.6 | 0.6 | 0.6 |
| θ (°) | 60 | 60 | 60 | 60 | 60 | 60 |
| Traction | 106 | 107 | 109 | 107 | 112 | 114 |

|  | Working Examples |  |  |  |  |  |  |
|---|---|---|---|---|---|---|---|
|  | 10 | 11 | 12 | 13 | 14 | 15 | 16 |
| First and second groove turning portions of circumferential primary grooves | Presence | Presence | Presence | Presence | Presence | Presence | Presence |
| Both-end-closed grooves | Presence | Presence | Presence | Presence | Presence | Presence | Presence |
| W1 (mm) | 20 | 20 | 20 | 20 | 20 | 20 | 20 |
| W1/W2 | 1.8 | 1.8 | 1.8 | 1.8 | 1.8 | 1.8 | 1.8 |
| Raised bottom portion | Presence | Presence | Presence | Presence | Presence | Presence | Presence |
| D1/T | 0.03 | 0.05 | 0.06 | 0.03 | 0.03 | 0.03 | 0.03 |
| D2/D3 | 0.3 | 0.3 | 0.3 | 0.5 | 0.7 | 1.0 | 1.2 |
| WB/T | 0.30 | 0.30 | 0.30 | 0.30 | 0.30 | 0.30 | 0.30 |
| L1/WB | 0.7 | 0.7 | 0.7 | 0.7 | 0.7 | 0.7 | 0.7 |
| A/L1 | 0.6 | 0.6 | 0.6 | 0.6 | 0.6 | 0.6 | 0.6 |
| θ (°) | 60 | 60 | 60 | 60 | 60 | 60 | 60 |
| Traction | 115 | 114 | 110 | 117 | 118 | 117 | 115 |

TABLE 3

|  | Working Example |  |  |  |  |  |
|---|---|---|---|---|---|---|
|  | 17 | 18 | 19 | 20 | 21 | 22 |
| First and second groove turning portions of circumferential primary grooves | Presence | Presence | Presence | Presence | Presence | Presence |
| Both-end-closed grooves | Presence | Presence | Presence | Presence | Presence | Presence |
| W1 (mm) | 20 | 20 | 20 | 20 | 20 | 20 |
| W1/W2 | 1.8 | 1.8 | 1.8 | 1.8 | 1.8 | 1.8 |
| Raised bottom portion | Presence | Presence | Presence | Presence | Presence | Presence |
| D1/T | 0.03 | 0.03 | 0.03 | 0.03 | 0.03 | 0.03 |
| D2/D3 | 0.7 | 0.7 | 0.7 | 0.7 | 0.7 | 0.7 |
| WB/T | 0.35 | 0.40 | 0.45 | 0.50 | 0.55 | 0.60 |
| L1/WB | 0.2 | 0.2 | 0.2 | 0.2 | 0.2 | 0.2 |
| A/L1 | 0.6 | 0.6 | 0.6 | 0.6 | 0.6 | 0.6 |

TABLE 3-continued

| θ (°) | 60 | 60 | 60 | 60 | 60 | 60 |
|---|---|---|---|---|---|---|
| Traction | 120 | 122 | 123 | 122 | 120 | 118 |

| | Working Example | | | | | |
|---|---|---|---|---|---|---|
| | 23 | 24 | 25 | 26 | 27 | 28 |
| First and second groove turning portions of circumferential primary grooves | Presence | Presence | Presence | Presence | Presence | Presence |
| Both-end-closed grooves | Presence | Presence | Presence | Presence | Presence | Presence |
| W1 (mm) | 20 | 20 | 20 | 20 | 20 | 20 |
| W1/W2 | 1.8 | 1.8 | 1.8 | 1.8 | 1.8 | 1.8 |
| Raised bottom portion | Presence | Presence | Presence | Presence | Presence | Presence |
| D1/T | 0.03 | 0.03 | 0.03 | 0.03 | 0.03 | 0.03 |
| D2/D3 | 0.7 | 0.7 | 0.7 | 0.7 | 0.7 | 0.7 |
| WB/T | 0.45 | 0.45 | 0.45 | 0.45 | 0.45 | 0.45 |
| L1/WB | 0.3 | 0.4 | 0.45 | 0.5 | 0.6 | 0.7 |
| A/L1 | 0.6 | 0.6 | 0.6 | 0.6 | 0.6 | 0.6 |
| θ (°) | 60 | 60 | 60 | 60 | 60 | 60 |
| Traction | 125 | 127 | 128 | 127 | 125 | 123 |

| | Working Example | | | | | | |
|---|---|---|---|---|---|---|---|
| | 29 | 30 | 31 | 32 | 33 | 34 | 35 |
| First and second groove turning portions of circumferential primary grooves | Presence | Presence | Presence | Presence | Presence | Presence | Presence |
| Both-end-closed grooves | Presence | Presence | Presence | Presence | Presence | Presence | Presence |
| W1 (mm) | 20 | 20 | 20 | 20 | 20 | 20 | 20 |
| W1/W2 | 1.8 | 1.8 | 1.8 | 1.8 | 1.8 | 1.8 | 1.8 |
| Raised bottom portion | Presence | Presence | Presence | Presence | Presence | Presence | Presence |
| D1/T | 0.03 | 0.03 | 0.03 | 0.03 | 0.03 | 0.03 | 0.03 |
| D2/D3 | 0.7 | 0.7 | 0.7 | 0.7 | 0.7 | 0.7 | 0.7 |
| WB/T | 0.45 | 0.45 | 0.45 | 0.45 | 0.45 | 0.45 | 0.45 |
| L1/WB | 0.45 | 0.45 | 0.45 | 0.45 | 0.45 | 0.45 | 0.45 |
| A/L1 | 0.2 | 0.3 | 0.4 | 0.5 | 0.4 | 0.4 | 0.4 |
| θ (°) | 60 | 60 | 60 | 60 | 70 | 80 | 90 |
| Traction | 128 | 130 | 131 | 130 | 133 | 134 | 135 |

On comparison between Conventional Example, Comparative Examples 1, 2, and Working Examples 1 to 3, it is understood that the both-end-closed grooves enhance traction performance. It is understood that especially the both-end-closed grooves having a width W1 of 15 to 25 mm can further enhance traction performance.

On comparison between Working Examples 2, 4 to 8, it is understood that a ratio W1/W2 of 1.2 to 2.5 of the width W1 of the both-end-closed grooves to the width W2 of the center lug grooves can further enhance traction performance.

On comparison between Working Examples 6, 8, it is understood that the raised bottom portions can further enhance traction performance. On comparison between Working Examples 8 to 12, it is understood that a ratio D1/T of 0.05 or less of the shallowest depth D1 of the raised bottom portions to the tread width T can enhance traction performance. It is understood that a ratio D1/T of 0.02 to 0.05 can further enhance traction performance.

On comparison between Working Examples 9, 13 to 16, it is understood that a ratio D2/D3 of 0.5 to 1.0 of the maximum depth D2 of the both-end-closed grooves to the maximum depth D3 of the center lug grooves can further enhance traction performance.

On comparison between Working Examples 14, 17 to 22, it is understood that a ratio WB/T of 0.35 to 0.55 of the width WB of the center blocks to the tread width T can enhance traction performance and that a ratio WB/T of 0.40 to 0.50 can further enhance traction performance.

On comparison between Working Examples 19, 23 to 28, it is understood that a ratio L1/WB of 0.3 to 0.6 of the length L1 of the both-end-closed grooves to the width WB of the center blocks can enhance traction performance and that a ratio L1/WB of 0.4 to 0.5 can further enhance traction performance.

On comparison between Working Examples 25, 29 to 32, a ratio A/L1 of 0.3 to 0.5 of the waving range A of the circumferential primary grooves to the length L1 of the both-end-closed grooves can further enhance traction performance.

On comparison between Working Examples 31, 33 to 35, it is understood that the both-end-closed grooves having an inclination angle θ of 70 to 90° can further enhance traction performance.

This clearly demonstrates the effect of the present embodiment.

The foregoing has been a detailed description of the heavy duty pneumatic tire of the present technology. However, the present technology is not limited to the above embodiments, and may be improved or modified in various ways within the scope of the present technology.

The invention claimed is:

1. A heavy duty pneumatic tire comprising a tread portion provided with a tread pattern, the tread pattern comprising:

a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends;

a plurality of shoulder lug grooves being separated from each other in the tire circumferential direction, the shoulder lug grooves extending toward an outside in the tire width direction in each of the half-tread regions, the shoulder lug grooves including outside ends in the tire width direction opening at ground contact ends positioned on both sides in the tire width direction, and the shoulder lug grooves each being disposed in the tire circumferential direction between adjacent center lug grooves in the tire circumferential direction among the center lug grooves;

a pair of circumferential primary grooves being disposed in the half-tread regions and being provided with first groove turning portions being curved or bent outward in the tire width direction and second groove turning portions being curved or bent inward in the tire width direction, the first groove turning portions and the second groove turning portions being arranged such that each of the circumferential primary grooves alternately connects an end of the center lug grooves and an end of the shoulder lug groove on an inside in the tire width direction in each of the half-tread regions, the circumferential primary grooves being formed in a wavy shape over an entire periphery of the tire, the circumferential primary grooves having a narrower width than a width of the shoulder lug grooves;

a plurality of center blocks being defined by the center lug grooves and the pair of circumferential primary grooves and being aligned in the tire circumferential direction; and a plurality of circumferential secondary grooves each extending in the tire circumferential direction, and connecting two adjacent center lug grooves in the tire circumferential direction of the plurality of the center lug grooves;

the center lug grooves each including a third groove turning portion bent or curved so as to protrude toward a third side in the tire circumferential direction on the first side and a fourth groove turning portion bent or curved so as to protrude toward a fourth side opposite to the third side in the tire circumferential direction on the second side;

the circumferential secondary grooves each connecting to the third groove turning portion of a center lug groove on the third side of the two adjacent center lug grooves, and each connecting to the fourth groove turning portion of a center lug groove on the fourth side of the two adjacent center lug grooves, wherein a portion of the circumferential secondary grooves connecting to the third groove turning portion extends from the third groove turning portion toward the fourth side and a portion of the circumferential secondary grooves connecting to the fourth groove turning portion extends from the fourth groove turning portion toward the third side;

the center lug grooves each connecting with the circumferential primary grooves at a first connection end on the first side and at a second connection end on the second side, each of the first connection end and the second connection end connecting with a tip of one of the second groove turning portions on the inside in the tire width direction, and the second connection end of the center lug groove being positioned on the third side in the tire circumferential direction with respect to the first connection end;

concerning central positions of the center lug grooves in a groove width direction, an inclination angle of a first straight line connecting between the first connection end and a protruding end toward the third side in the tire circumferential direction of the third groove turning portion with respect to the tire width direction and an inclination angle of a second straight line connecting between the second connection end and a protruding end toward the fourth side in the tire circumferential direction of the fourth groove turning portion with respect to the tire width direction being greater than an inclination angle of a third straight line connecting between the first connection end and the second connection end of each of the center lug grooves with respect to the tire width direction;

the first line, the second line, and the third line each inclining in a same inclination direction with respect to the tire width direction; and the center lug grooves each including a portion between the third groove turning portion and the fourth groove turning portion, the portion between the third groove turning portion and the fourth groove turning portion inclining in a opposite direction to the first line, the second line, and the third line with respect to the tire width direction.

2. The heavy duty pneumatic tire according to claim 1, wherein concerning the central positions of the center lug grooves in the groove width direction, a section of each of the center lug grooves between the protruding end toward the third side in the tire circumferential direction of the third groove turning portion and the first connection end is on the first straight line or on the third side with respect to the first straight line, and a section of each of the center lug grooves between the protruding end toward the fourth side in the tire circumferential direction of the fourth groove turning portion and the second connection end is on the second straight line or on the fourth side with respect to the second straight line.

3. The heavy duty pneumatic tire according to claim 1, wherein the pair of circumferential primary grooves each includes a raised bottom portion formed by partially making a groove depth shallow.

4. The heavy duty pneumatic tire according to claim 3, wherein the groove depth $D1$ of the raised bottom portion and a ground contact width $T$ of the tread portion in the tire width direction satisfy a relationship of $D1/T<0.05$.

5. The heavy duty pneumatic tire according to claim 1, wherein a maximum width $WB$ of the center blocks in the tire width direction and a tread width $T$ of the tread portion in the tire width direction satisfy a relationship of $0.35 \leq WB/T \leq 0.55$.

6. The heavy duty pneumatic tire according to claim 1, wherein the center blocks have corners in correspondence with the first groove turning portions of the circumferential primary grooves; and the corners have obtuse angles.

7. The heavy duty pneumatic tire according to claim 1, wherein the width of the circumferential primary grooves and the width of the center lug groove are 7 mm or greater and 20 mm or less.

8. The heavy duty pneumatic tire according to claim 1, wherein the heavy duty pneumatic tire is fitted to a construction or industrial vehicle.

9. A heavy duty pneumatic tire comprising a tread portion provided with a tread pattern, the tread pattern comprising:
- a plurality of center lug grooves being separated from each other in a tire circumferential direction, the center lug grooves extending in half-tread regions on a first side and a second side of a tire equator line in a tire width direction so as to cross the tire equator line, and the center lug grooves including both ends;
- a plurality of shoulder lug grooves being separated from each other in the tire circumferential direction, the shoulder lug grooves extending toward an outside in the tire width direction in each of the half-tread regions, the shoulder lug grooves including outside ends in the tire width direction opening at ground contact ends positioned on both sides in the tire width direction, and the shoulder lug grooves each being disposed in the tire circumferential direction between adjacent center lug grooves in the tire circumferential direction among the center lug grooves;
- a pair of circumferential primary grooves being disposed in the half-tread regions and being provided with first groove turning portions being curved or bent outward in the tire width direction and second groove turning portions being curved or bent inward in the tire width direction, the first groove turning portions and the second groove turning portions being arranged such that each of the circumferential primary grooves alternately connects an end of the center lug grooves and an end of the shoulder lug groove on an inside in the tire width direction in each of the half-tread regions, the circumferential primary grooves being formed in a wavy shape over an entire periphery of the tire, the circumferential primary grooves having a narrower width than a width of the shoulder lug grooves; and
- a plurality of center blocks being defined by the center lug grooves and the pair of circumferential primary grooves and being aligned in the tire circumferential direction;
- the center lug grooves each including a third groove turning portion bent or curved so as to protrude toward a third side in the tire circumferential direction on the first side and a fourth groove turning portion bent or curved so as to protrude toward a fourth side opposite to the third side in the tire circumferential direction on the second side;
- the center lug grooves each connecting with the circumferential primary grooves at a first connection end on the first side and at a second connection end on the second side, each of the first connection end and the second connection end connecting with a tip of one of the second groove turning portions on the inside in the tire width direction, and the second connection end of the center lug groove being positioned on the third side in the tire circumferential direction with respect to the first connection end;
- a plurality of circumferential secondary grooves each extending in the tire circumferential direction, and connecting two adjacent center lug grooves in the tire circumferential direction of the plurality of the center lug grooves, the circumferential secondary grooves each connecting to the third groove turning portion of a center lug groove on the third side of the two adjacent center lug grooves, and each connecting to the fourth groove turning portion of a center lug groove on the fourth side of the two adjacent center lug grooves, wherein a portion of the circumferential secondary grooves connecting to the third groove turning portion extends from the third groove turning portion toward the fourth side and a portion of the circumferential secondary grooves connecting to the fourth groove turning portion extends from the fourth groove turning portion toward the third side;
- concerning central positions of the center lug grooves in a groove width direction, an inclination angle of a first straight line connecting between the first connection end and a protruding end toward the third side in the tire circumferential direction of the third groove turning portion with respect to the tire width direction and an inclination angle of a second straight line connecting between the second connection end and a protruding end toward the fourth side in the tire circumferential direction of the fourth groove turning portion with respect to the tire width direction being greater than an inclination angle of a third straight line connecting between the first connection end and the second connection end of each of the center lug grooves with respect to the tire width direction; and
- both-end-closed grooves being disposed in regions enclosed by the circumferential primary grooves and the center lug grooves, the both-end-closed grooves including both ends in positions separated from the circumferential primary grooves and the center lug grooves, and the both-end-closed grooves extending in the tire width direction;
- wherein a width W1 of the both-end-closed grooves is 15 mm≤W1≤25 mm.

10. The heavy duty pneumatic tire according to claim 9, wherein a width W2 of the center lug grooves satisfies a relationship of 1.20≤W1/W2≤2.50.

11. The heavy duty pneumatic tire according to claim 9, wherein a maximum depth D2 of the both-end-closed grooves and a maximum depth D3 of the center lug grooves satisfy a relationship of 0.5≤D2/D3≤1.0.

12. The heavy duty pneumatic tire according to claim 9, wherein a maximum width WB of the center blocks in the tire width direction and a maximum length L1 of the both-end-closed grooves in the tire width direction satisfy a relationship of 0.3≤L1/WB≤0.6.

13. The heavy duty pneumatic tire according to claim 9, wherein a maximum length L1 of the both-end-closed grooves in the tire width direction and a waving range A of the wavy shapes of the circumferential primary grooves satisfy a relationship of 0.3≤A/L1≤0.5.

14. The heavy duty pneumatic tire according to claim 9, wherein the both-end-closed grooves are inclined with respect to the tire circumferential direction;
and an inclination angle of the both-end-closed grooves with respect to the tire circumferential direction is 70° or greater and 90° or less.

15. The heavy duty pneumatic tire according to claim 9, wherein the circumferential secondary grooves intersect the both-end-closed grooves, the circumferential secondary grooves including both ends connecting with the center lug grooves.

16. The heavy duty pneumatic tire according to claim 15, wherein the circumferential secondary grooves include groove turning portions being curved or bent.

* * * * *